United States Patent
Kawasaki

(10) Patent No.: US 11,595,601 B2
(45) Date of Patent: Feb. 28, 2023

(54) SOLID-STATE IMAGING ELEMENT, IMAGING DEVICE, AND CONTROL METHOD OF SOLID-STATE IMAGING ELEMENT

(71) Applicant: SONY SEMICONDUCTOR SOLUTIONS CORPORATION, Kanagawa (JP)

(72) Inventor: Ryohei Kawasaki, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 0 days.

(21) Appl. No.: 17/291,732

(22) PCT Filed: Sep. 20, 2019

(86) PCT No.: PCT/JP2019/036890
§ 371 (c)(1),
(2) Date: May 6, 2021

(87) PCT Pub. No.: WO2020/100427
PCT Pub. Date: May 22, 2020

(65) Prior Publication Data
US 2022/0014695 A1  Jan. 13, 2022

(30) Foreign Application Priority Data
Nov. 16, 2018 (JP) .............................. JP2018-215191

(51) Int. Cl.
*H04N 5/357* (2011.01)
*H04N 5/363* (2011.01)
(Continued)

(52) U.S. Cl.
CPC ........... *H04N 5/3575* (2013.01); *H04N 5/363* (2013.01); *H04N 5/3745* (2013.01); *H04N 5/378* (2013.01)

(58) Field of Classification Search
CPC .... H04N 5/3575; H04N 5/363; H04N 5/3745; H04N 5/378; H04N 5/33
(Continued)

(56) References Cited

U.S. PATENT DOCUMENTS

2008/0291295 A1* 11/2008 Kato ...................... H04N 19/17
382/254
2017/0078607 A1  3/2017 Totsuka et al.
(Continued)

FOREIGN PATENT DOCUMENTS

CN  106534724 A  3/2017
CN  107615753 A  1/2018
(Continued)

OTHER PUBLICATIONS

International Search Report and Written Opinion of PCT Application No. PCT/JP2019/036890, dated Dec. 3, 2019, 10 pages of ISRWO.

(Continued)

*Primary Examiner* — Lin Ye
*Assistant Examiner* — Chan T Nguyen
(74) *Attorney, Agent, or Firm* — Chip Law Group

(57) ABSTRACT

In a solid-state imaging element that transfers data in a vertical direction, the number of times of transfer is reduced. The solid-state imaging element is provided with a plurality of storage units and a data transfer circuit. In the solid-state imaging element, each of the plurality of storage units is provided with a holding unit that holds predetermined reset data and signal data according to an amount of light, and an arithmetic circuit that obtains a difference between the reset data and the signal data to output as pixel data. Furthermore, the data transfer circuit in the solid-state imaging element transfers the output pixel data.

13 Claims, 31 Drawing Sheets

(51) Int. Cl.
*H04N 5/3745* (2011.01)
*H04N 5/378* (2011.01)

(58) Field of Classification Search
USPC .......................................................... 348/294
See application file for complete search history.

(56) References Cited

U.S. PATENT DOCUMENTS

2018/0027192 A1* 1/2018 Morisaki ............ H04N 5/37457
348/308
2018/0103216 A1 4/2018 Sakakibara et al.

FOREIGN PATENT DOCUMENTS

| | | | |
|---|---|---|---|
| JP | 2014-232900 A | | 12/2014 |
| JP | WO2017/018215 | * | 2/2017 |
| JP | 2017-055382 A | | 3/2017 |
| WO | 2017/018215 A1 | | 2/2017 |

OTHER PUBLICATIONS

Sakakibara, et al., "A Back-Illuminated Global-Shutter CMOS Image Sensor with Pixel-Parallel 14b Subthreshold ADC," ISSCC 2018, Session 5, Image Sensors, 5.1, Feb. 2018, 3 pages.

* cited by examiner

SOLID-STATE IMAGING ELEMENT, IMAGING DEVICE, AND CONTROL METHOD OF SOLID-STATE IMAGING ELEMENT

CROSS REFERENCE TO RELATED APPLICATIONS

This application is a U.S. National Phase of International Patent Application No. PCT/JP2019/036890 filed on Sep. 20, 2019, which claims priority benefit of Japanese Patent Application No. JP 2018-215191 filed in the Japan Patent Office on Nov. 16, 2018. Each of the above-referenced applications is hereby incorporated herein by reference in its entirety.

TECHNICAL FIELD

The present technology relates to a solid-state imaging element, an imaging device, and a control method of a solid-state imaging element. More specifically, the present technology relates to a solid-state imaging element that performs correlated double sampling, an imaging device, and a control method of a solid-state imaging element.

BACKGROUND ART

Conventionally, correlated double sampling (CDS) processing for sampling a reset level and a signal level to obtain a difference is used in a solid-state imaging element for the purpose of removing fixed pattern noise, for example. For example, a solid-state imaging element in which a plurality of analog to digital converters (ADCs), a repeater, and a CDS circuit are arranged is proposed (refer to, for example, Non-Patent Document 1). In the solid-state imaging element, each of the ADCs performs analog to digital (AD) conversion of the reset level and the signal level in order, the repeater transfers data after the AD conversion to the CDS circuit in a vertical direction, and the CDS circuit performs the CDS processing on the data.

CITATION LIST

Non-Patent Document

Non-Patent Document 1: M. Sakakibara, et al., "A Back-Illuminated Global-Shutter CMOS Image Sensor with Pixel-Parallel 14b Subthreshold ADC," ISSCC Dig. Tech. Papers, pp. 80-82, February 2018.

SUMMARY OF THE INVENTION

Problems to be Solved by the Invention

In the above-described solid-state imaging element, an image quality of image data is improved by the CDS processing. However, in the above-described solid-state imaging element, the repeater needs to transfer both the reset level and the signal level to the CDS circuit in order for each pixel. Therefore, there is a problem that, as the number of pixels increases, the number of times of transfer of the repeater increases, and power consumption increases.

The present technology is achieved in view of such a situation, and an object thereof is to reduce the number of times of transfer in the solid-state imaging element that transfers the data in the vertical direction.

Solutions to Problems

The present technology is achieved for solving the above-described problem, and a first aspect thereof is a solid-state imaging element provided with a plurality of storage units each provided with a holding unit that holds predetermined reset data and signal data according to an amount of light, and an arithmetic circuit that obtains a difference between the reset data and the signal data and outputs the difference as pixel data, and a data transfer circuit that transfers the output pixel data, and a control method thereof. This brings an effect that an arithmetic operation of the difference between the reset data and the signal data is performed before the transfer.

Furthermore, in the first aspect, the holding unit may be provided with a predetermined number of holding circuits, and the arithmetic circuit may be commonly connected to the predetermined number of holding circuits. This brings an effect that the arithmetic circuit shared by a predetermined number of holding circuits performs an arithmetic operation of the difference.

Furthermore, in the first aspect, the holding unit may output the reset data and the signal data to the arithmetic circuit in order bit by bit, and the arithmetic circuit may obtain a difference between the output bit of the reset data and the output bit of the signal data. This brings an effect that an arithmetic operation of the difference is performed bit by bit.

Furthermore, in the first aspect, the holding unit may output the reset data and the signal data to the arithmetic circuit in order in units of two bits, and the arithmetic circuit may obtain a difference between the output two bits of the reset data and the output two bits of the signal data. This brings an effect that an arithmetic operation of the difference is performed in units of two bits.

Furthermore, in the first aspect, the plurality of storage units may be arranged in a two-dimensional lattice manner, the arithmetic circuit may add the pixel data of each of a predetermined number of storage units arranged in a predetermined horizontal direction out of the plurality of storage units, and the data transfer circuit may transfer the added pixel data in a direction perpendicular to the horizontal direction. This brings an effect that the pixel data is added before the transfer.

Furthermore, in the first aspect, the arithmetic circuit may perform weighting addition of a predetermined number of the pixel data. This brings an effect that the weighting addition of the pixel data is performed before the transfer.

Furthermore, in the first aspect, a plurality of unit blocks may be arranged in each of the plurality of storage units, and a predetermined number of holding units commonly connected to the arithmetic circuit and the arithmetic circuit may be arranged in each of the plurality of unit blocks. This brings an effect that an arithmetic operation of the difference is performed in parallel by a plurality of arithmetic circuits.

Furthermore, in the first aspect, a predetermined number of holding units commonly connected to the arithmetic circuit may be arranged in a storage unit. This brings an effect that an arithmetic operation of the difference is performed by the arithmetic circuit shared by a predetermined number of holding units.

Furthermore, in the first aspect, the arithmetic circuit may be further provided with a code conversion circuit that converts a code format of each of the reset data and the signal data, and a correlated double sampling circuit that obtains a difference between the reset data the code format of which is converted and the signal data the code format of which is converted as the pixel data. This brings an effect of converting the code format before the transfer.

Furthermore, in the first aspect, the holding unit may be provided with a former stage holding unit that holds the reset data and the signal data in order and outputs the reset data and the signal data to the arithmetic circuit, and a latter stage holding unit that holds the reset data and outputs the reset data to the arithmetic circuit, and holds the pixel data and outputs the pixel data to the data transfer circuit. This brings an effect that an arithmetic operation of a difference between the reset data held in the latter stage holding unit and the signal data held in the former stage holding unit is performed before the transfer.

Furthermore, a second aspect of the present technology is a solid-state imaging element provided with a pixel array unit that includes a plurality of pixels, a plurality of storage units each provided with a holding unit that holds predetermined reset data and signal data according to an amount of light, and an arithmetic circuit that obtains a difference between the reset data and the signal data and outputs the difference as pixel data, and a transfer circuit that transfers the output pixel data, in which the arithmetic circuit is arranged immediately below the pixel array unit. This brings an effect that the arithmetic circuit immediately below the pixel array performs an arithmetic operation of the difference between the reset data and the signal data before the transfer.

Furthermore, the second aspect of the present technology is an imaging device provided with a plurality of storage units each provided with a holding unit that holds predetermined reset data and signal data according to an amount of light, and an arithmetic circuit that obtains a difference between the reset data and the signal data and outputs the difference as pixel data, a data transfer circuit that transfers the output pixel data, and a pixel data processing circuit that processes the transferred pixel data. This brings an effect that an arithmetic operation of the difference between the reset data and the signal data is performed before the transfer and the pixel data is processed after the transfer.

MODE FOR CARRYING OUT THE INVENTION

Modes for carrying out the present technology (hereinafter, referred to as embodiments) are hereinafter described. The description is given in the following order.

1. First Embodiment (example of performing CDS processing before data transfer)
2. Second Embodiment (example of performing CDS processing in units of two bits before data transfer)
3. Third Embodiment (example in which a plurality of arithmetic circuits that performs CDS processing before data transfer is arranged in storage unit)
4. Fourth Embodiment (example in which a plurality of clusters shares arithmetic circuit that performs CDS processing before data transfer)
5. Fifth Embodiment (example of performing CDS processing and pixel addition before data transfer)
6. Sixth Embodiment (example of performing CDS processing and weighting addition before data transfer)
7. Application Example to Mobile Body

1. FIRST EMBODIMENT

[Configuration Example of Imaging Device]

Figure 1:
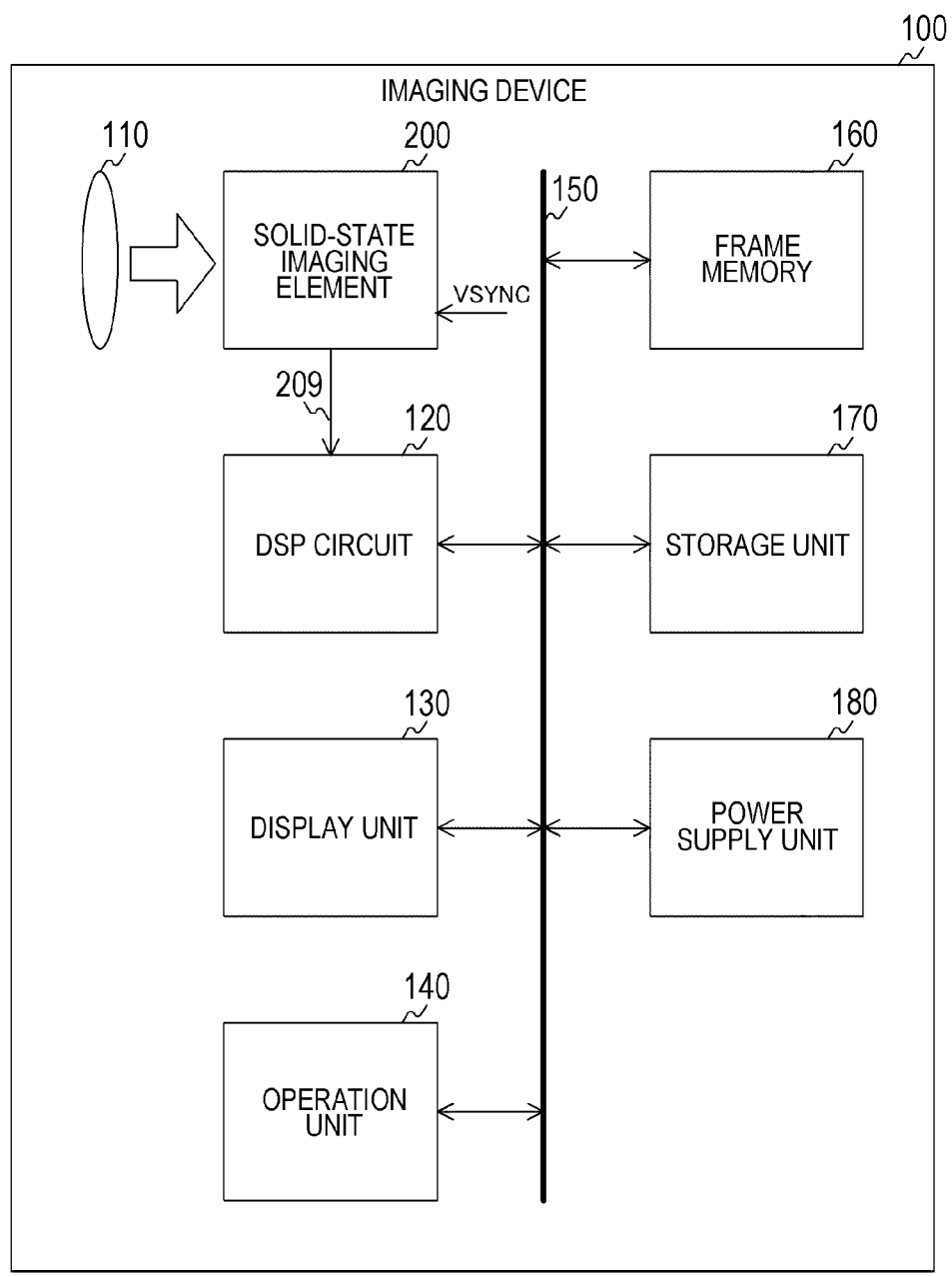
FIG. 1 is a block diagram illustrating a configuration example of an imaging device in a first embodiment of the present technology.

FIG. 1 is a block diagram illustrating a configuration example of an imaging device 100 in a first embodiment of the present technology. The imaging device 100 is a device for imaging image data, the device provided with an optical unit 110, a solid-state imaging element 200, and a digital signal processing (DSP) circuit 120. The imaging device 100 is further provided with a display unit 130, an operation unit 140, a bus 150, a frame memory 160, a storage unit 170, and a power supply unit 180. As the imaging device 100, for example, in addition to a digital camera such as a digital still camera, a smartphone and a personal computer having an imaging function, an in-vehicle camera and the like are assumed.

The optical unit 110 condenses light from a subject and guides the same to the solid-state imaging element 200. The solid-state imaging element 200 generates the image data by photoelectric conversion in synchronization with a vertical synchronization signal VSYNC. Here, the vertical synchronization signal VSYNC is a periodic signal of a predetermined frequency indicating imaging timing. The solid-state imaging element 200 supplies the generated image data to the DSP circuit 120 via a signal line 209.

The DSP circuit 120 executes predetermined signal processing on the image data from the solid-state imaging element 200. The DSP circuit 120 outputs the processed image data to the frame memory 160 and the like via the bus 150.

The display unit 130 displays the image data. As the display unit 130, for example, a liquid crystal panel or an organic electro luminescence (EL) panel is assumed. The operation unit 140 generates an operation signal in accordance with a user operation.

The bus 150 is a common path for the optical unit 110, the solid-state imaging element 200, the DSP circuit 120, the display unit 130, the operation unit 140, the frame memory 160, the storage unit 170, and the power supply unit 180 to exchange data with one another.

The frame memory 160 holds the image data. The storage unit 170 stores various data such as the image data. The power supply unit 180 supplies power to the solid-state imaging element 200, the DSP circuit 120, the display unit 130 and the like.

[Configuration Example of Solid-State Imaging Element]

Figure 2:
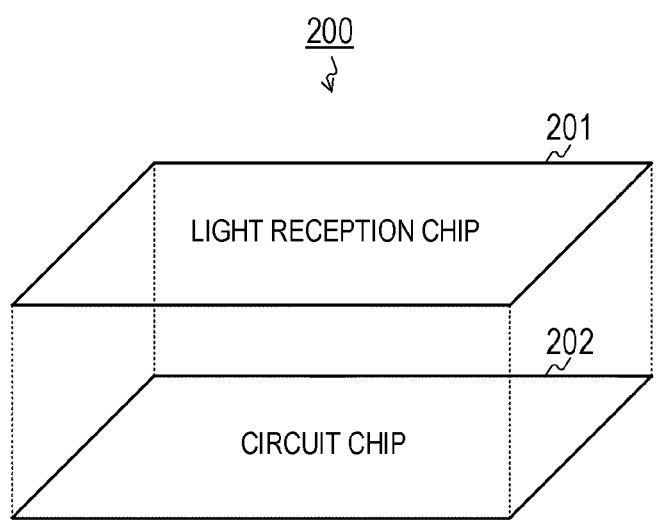
FIG. 2 is a view illustrating an example of a stacked structure of the imaging device in the first embodiment of the present technology.

FIG. 2 is a view illustrating an example of a stacked structure of the solid-state imaging element 200 in the first embodiment of the present technology. The solid-state imaging element 200 is provided with a circuit chip 202 and a light reception chip 201 stacked on the circuit chip 202. These chips are electrically connected to each other via a connection unit such as a via. Note that, they may also be connected to each other by Cu—Cu joint or a bump in addition to the via.

Figure 3:
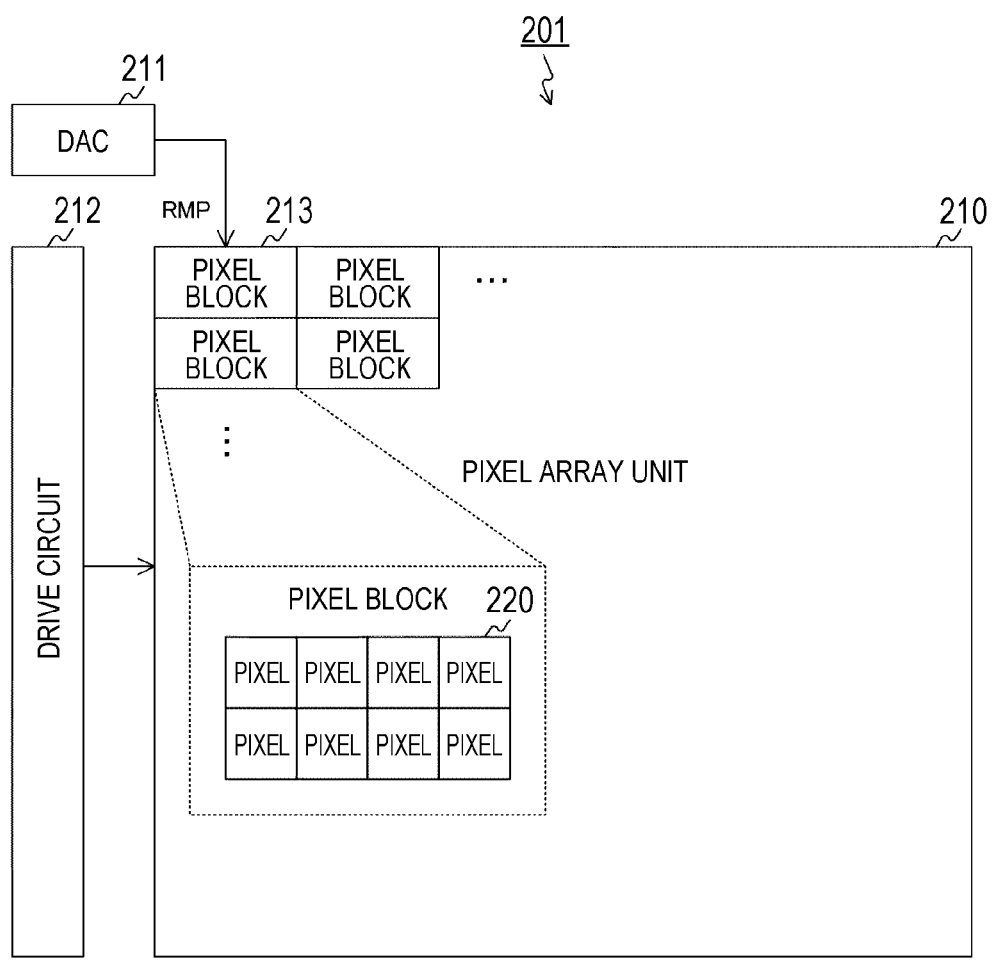
FIG. 3 is a block diagram illustrating a configuration example of a light reception chip in the first embodiment of the present technology.

FIG. 3 is a block diagram illustrating a configuration example of the light reception chip 201 in the first embodiment of the present technology. A digital-to-analog converter (DAC) 211, a drive circuit 212, and a pixel array unit 210 are arranged on the light reception chip 201. Furthermore, in the pixel array unit 210, a plurality of pixel blocks 213 is arranged in a two-dimensional lattice manner. A predetermined number of pixels 220 are arranged in each pixel block 213. For example, in each of the pixel blocks 213, eight pixels 220 in two rows by four columns are arranged. Note that the number of pixels in the pixel block 213 is not limited to eight, and may be, for example, four in two rows by two columns.

The DAC 211 generates a predetermined reference signal RMP that changes in a slope manner over time by digital-to-analog (DA) conversion. The DAC 211 supplies the generated reference signal RMP to the pixel array unit 210. Note that main bodies of the DAC 211 and the drive circuit 212 may be arranged on the circuit chip 202. In this case, each output is connected between upper and lower chips, and the signal is supplied to the light reception chip 202.

The drive circuit 212 drives the pixel 220. The pixel 220 generates a reset level and a signal level in order under the control of the drive circuit 212. Here, the reset level is a level when the pixel 220 is initialized, and the signal level is a level according to an amount of light received at the end of exposure.

Figure 4:
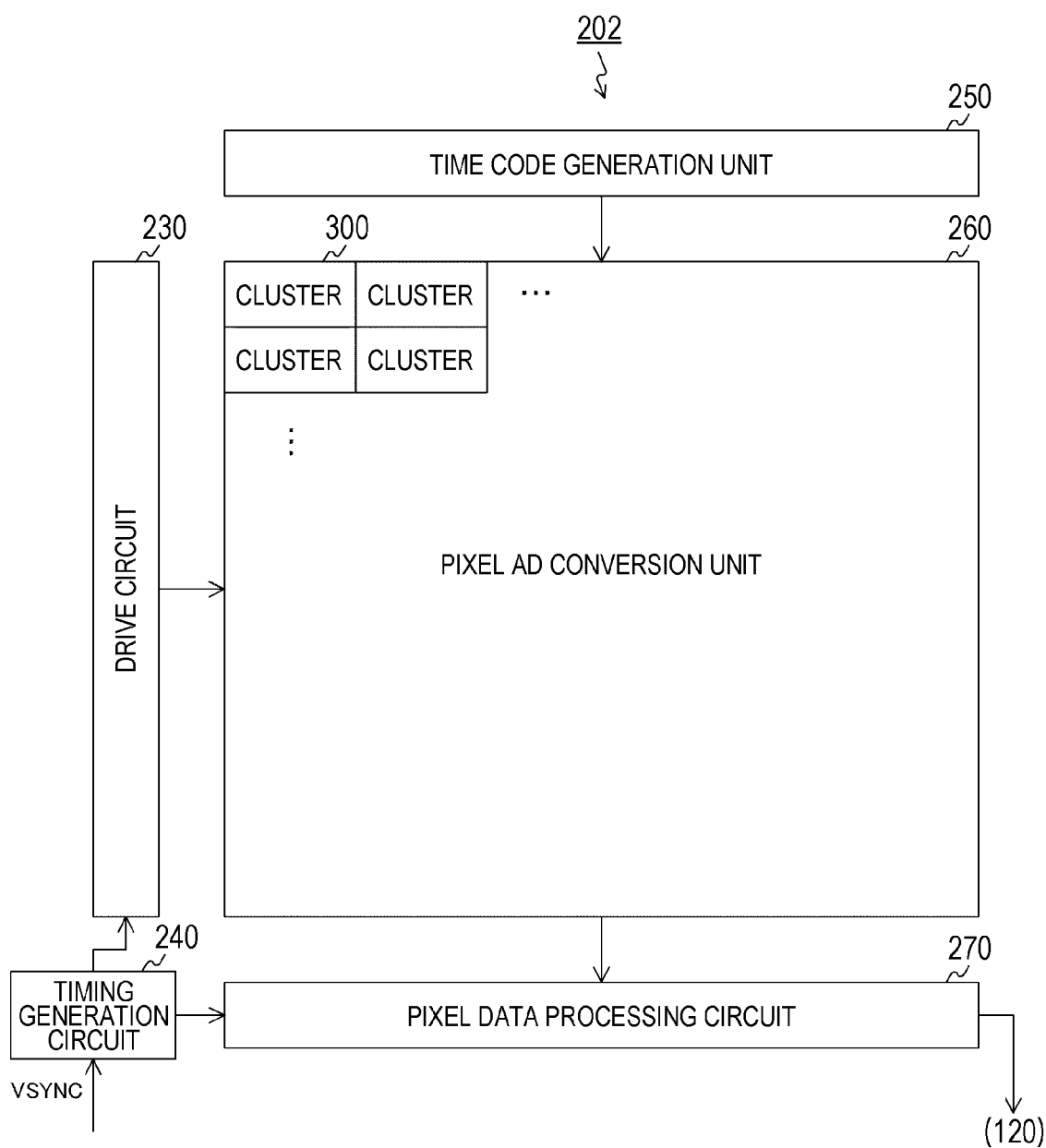
FIG. 4 is a block diagram illustrating a configuration example of a circuit chip in the first embodiment of the present technology.

FIG. 4 is a block diagram illustrating a configuration example of the circuit chip 202 in the first embodiment of the present technology. The circuit chip 202 is provided with a drive circuit 230, a timing generation circuit 240, a time code generation unit 250, a pixel AD conversion unit 260, and a pixel data processing circuit 270. Furthermore, in the pixel AD conversion unit 260, a plurality of clusters 300 is arranged in a two-dimensional lattice manner. One cluster 300 is arranged for each pixel block 213 on the light reception chip 201, and the pixel block 213 and the corresponding cluster 300 are connected to each other.

The timing generation circuit 240 controls operation timing of the drive circuit 230 and the pixel data processing circuit 270.

The cluster 300 AD-converts the reset level and the signal level of each of the pixels 220 in the corresponding pixel block 213, and further performs CDS processing. The cluster 300 supplies the data after the CDS processing as the pixel data to the pixel data processing circuit 270.

The drive circuit 230 drives a plurality of clusters 300.

The time code generation unit 250 generates a time code indicating time within a period in which the reference signal RMP changes. The time code generation unit 250 is realized by, for example, a counter. As the counter, for example, a Gray code counter is used, and a code format of the time code is, for example, a Gray code. By using the Gray code, power consumption of a data transfer circuit 380 may be reduced as compared with a case where a binary code is used. The time code generation unit 250 supplies the generated time code to the pixel AD conversion unit 260.

Note that the time code generation unit 250 may also generate the time code using a counter other than the Gray code counter such as a Johnson counter and a binary counter.

The pixel data processing circuit 270 performs predetermined signal processing such as demosaic processing and dark current correction processing on the pixel data. The pixel data processing circuit 270 transfers processed data in a horizontal direction and supplies the same to the DSP circuit 120.

[Configuration Example of Pixel AD Conversion Unit]

Figure 5:
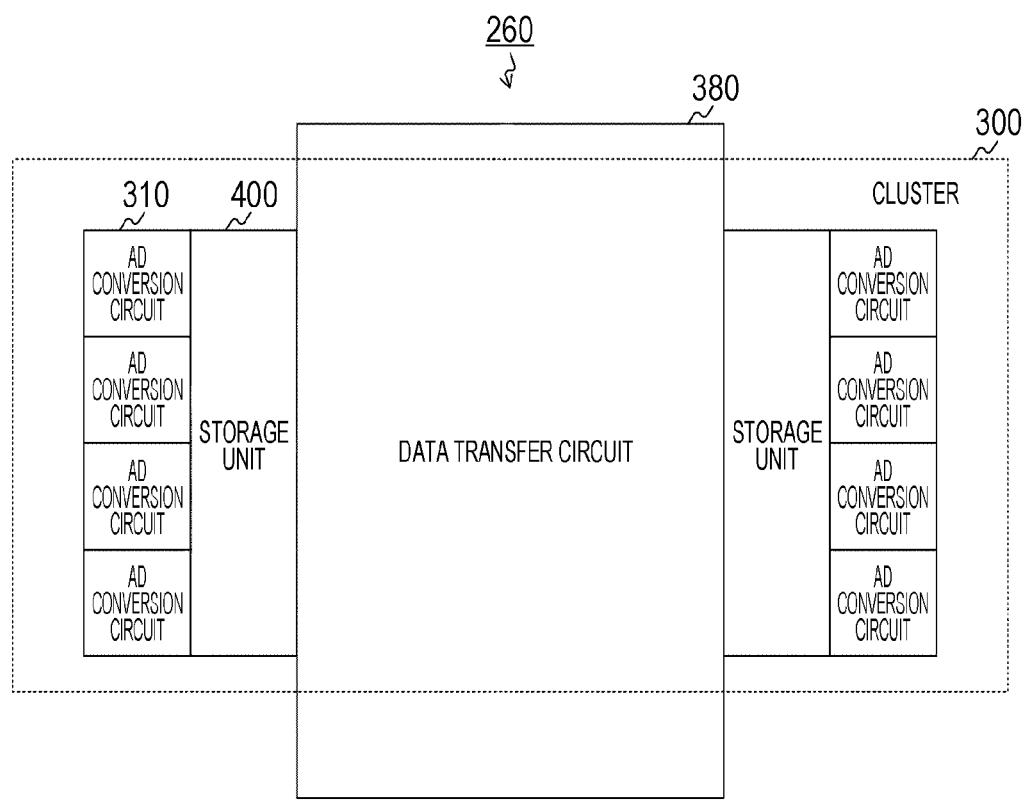
FIG. 5 is a block diagram illustrating a configuration example of a pixel AD conversion unit in the first embodiment of the present technology.

FIG. 5 is a block diagram illustrating a configuration example of the pixel AD conversion unit 260 in the first embodiment of the present technology. In the pixel AD conversion unit 260, the data transfer circuit 380 is arranged for each column of the clusters 300 in addition to the clusters 300.

Furthermore, the cluster 300 is provided with a plurality of AD conversion circuits 310 and a pair of storage units 400. In the cluster 300, one AD conversion circuit 310 is arranged for each pixel 220 in the pixel block 213. For example, in a case where the number of pixels in the pixel block 213 is eight, eight AD conversion circuits 310 are arranged. A pair of storage units 400 are arranged in the horizontal direction, and the data transfer circuit 380 is arranged between them. Furthermore, half of the eight AD conversion circuits 310 are connected to one of a pair of storage units 400, and the rest are connected to the other of a pair of storage units 400.

The AD conversion circuit 310 compares the reset level and the signal level of the corresponding pixel 220 in order with the reference signal RMP. The AD conversion circuit 310 supplies a comparison result to the storage unit 400. Four AD conversion circuits 310 connected to one storage unit 400 supply the comparison result in turns to the storage unit 400.

The data transfer circuit 380 transfers the time code from the time code generation unit 250 to the storage unit 400 in a vertical direction, and transfers the pixel data from the storage unit 400 to the pixel data processing circuit 270 in the vertical direction.

The storage unit 400 holds the time code when the comparison result from the AD conversion circuit 310 is inverted. The storage unit 400 holds the time code corresponding to the reset level as reset data, and holds the time code corresponding to the signal level as signal data. Then, the storage unit 400 performs the CDS processing for obtaining a difference between the reset data and the signal data as the pixel data, and supplies the pixel data to the data transfer circuit 380.

With the above-described configuration, one reset data and one signal data are generated for each pixel 220, and one pixel data is generated by the CDS processing on them. In a case where eight AD conversion circuits 310 are arranged in one cluster 300, eight pixel data are generated by them and two storage units 400. Furthermore, since the AD conversion circuit 310 is arranged for each pixel, the drive circuit 230 may expose all the pixels at the same time to execute the AD conversion.

Figure 6:
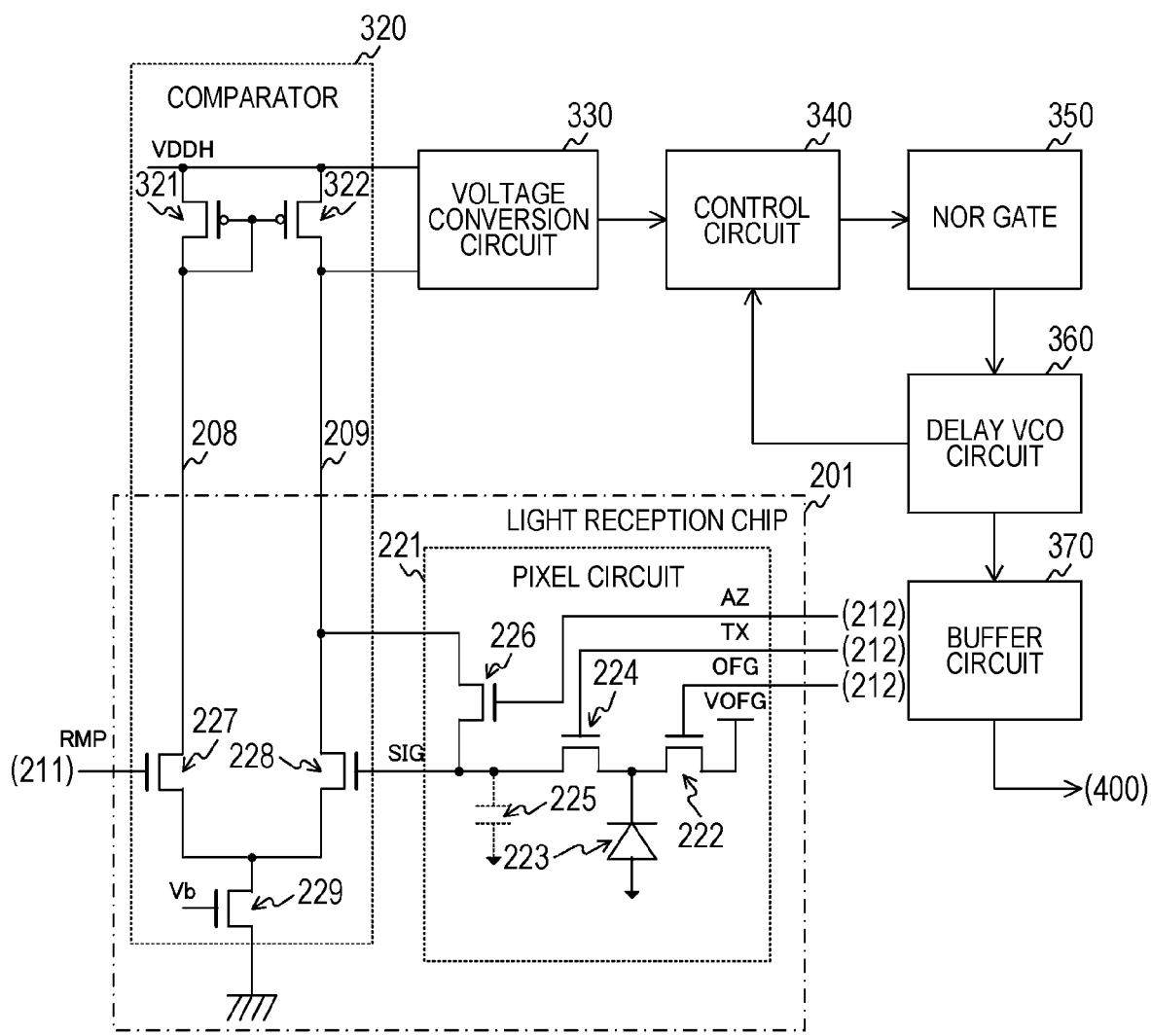
FIG. 6 is a circuit diagram illustrating a configuration example of a pixel and an AD conversion circuit in the first embodiment of the present technology.

FIG. 6 is a circuit diagram illustrating a configuration example of the pixel 220 and the AD conversion circuit 310 in the first embodiment of the present technology. The pixel 220 is provided with a pixel circuit 221, differential transistors 227 and 228, and a current source transistor 229. Furthermore, the AD conversion circuit 310 is provided with p-type transistors 321 and 322, a voltage conversion circuit 330, a control circuit 340, a negative OR (NOR) gate 350, a delay VCO circuit 360, and a buffer circuit 370.

The pixel circuit 221 generates the reset level and the signal level in order under the control of the drive circuit 212. The pixel circuit 221 is provided with a discharge transistor 222, a photodiode 223, a transfer transistor 224, a floating diffusion layer 225, and a reset transistor 226.

The photodiode 223 generates an electric charge by photoelectrical conversion. The discharge transistor 222 discharges the electric charge from the photodiode 223 when discharge is instructed by a drive signal OFG from the drive circuit 230.

The transfer transistor 224 transfers the electric charge from the photodiode 223 to the floating diffusion layer 225 at the end of exposure when transfer is instructed by a transfer signal TX from the drive circuit 212.

The floating diffusion layer 225 accumulates the transferred electric charges and generates an analog signal SIG of a voltage according to an accumulated electric charge amount.

The reset transistor 226 initializes the floating diffusion layer 225 when initialization is instructed by a reset signal AZ from the drive circuit 212.

A level of the analog signal SIG when the pixel circuit 221 is initialized corresponds to the reset level.

Furthermore, a level of the analog signal SIG according to an exposure amount at the end of exposure corresponds to the signal level. Note that the pixel circuit 221 is not limited to the circuit illustrated in the drawing as long as this may generate the analog signal SIG. For example, a configuration obtained by deleting the discharge transistor 222 is also possible.

Furthermore, as the differential transistors 227 and 228, for example, n-type MOS transistors are used. Drains of the differential transistors 227 and 228 are connected to a circuit in the circuit chip 202 via signal lines 208 and 209, respectively. A gate of the differential transistor 228 is connected to the floating diffusion layer 225, and a gate of the differential transistor 227 is connected to the DAC 211. Sources of the differential transistors 227 and 228 are commonly connected to a current source transistor 229.

The current source transistor 229 supplies a constant current. For example, an n-type MOS transistor is used as the current source transistor 229. Furthermore, the current source transistor 229 is inserted between a common node of the differential transistors 227 and 228 and a terminal of a predetermined reference potential (such as a ground potential).

The p-type transistors 321 and 322 are connected in parallel to a terminal of a power supply voltage VDDH. Furthermore, a gate of the p-type transistor 321 is connected to a drain thereof and a gate of the p-type transistor 322. Furthermore, the drain of the p-type transistor 321 is connected to the drain of the differential transistor 227 via the signal line 208. A drain of the p-type transistor 322 is connected to the drain of the differential transistor 228 via the signal line 209, and is also connected to the voltage conversion circuit 330.

With the above-described connection configuration, a circuit including the p-type transistors 321 and 322, the differential transistors 227 and 228, and the current source transistor 229 serves as a comparator 320 that compares the analog signal SIG with the reference signal RMP.

The voltage conversion circuit 330 converts a voltage of an output signal from the comparator 320. By switching to a lower-system voltage, a low withstand voltage transistor may be used in a latter circuit. Therefore, an area of the circuit in the latter stage may be reduced. The voltage conversion circuit 330 supplies the converted signal to the control circuit 340.

The control circuit 340 accelerates inversion transition of an output signal of the voltage conversion circuit 330.

The NOR gate 350 supplies the delay VCO circuit 360 with a negative AND of the signal from the control circuit 340 and the drive signal from the drive circuit 230.

The delay VCO circuit 360 delays an output signal from the NOR gate 350 and generates a pulse signal. The delay VCO circuit 360 supplies the delayed signal to the control circuit 340 as a feedback signal, and supplies the pulse signal to the buffer circuit 370. By generating the pulse signal, it is possible to reduce power consumed when the time code is input to the storage unit 400 within an AD conversion period.

A circuit including the control circuit 340, the NOR gate 350, and the delay VCO circuit 360 described above serves as a positive feedback circuit that feeds back a part of the output to the input and accelerates the inversion transition of a comparison result VCO.

The buffer circuit 370 supplies an output signal of the delay VCO circuit 360 to the storage unit 400 as the comparison result VCO. The buffer circuit 370 may secure a driving force of circuits in a latter stage.

Note that, although the circuits in the latter stage after the p-type transistors 321 and 322 are arranged on the circuit chip 202 and the circuits other than them are arranged on the light reception chip 201, the circuits arranged on the respective chips are not limited to this configuration.

Furthermore, although it is switched to a lower-system voltage, in a case where there is little need to reduce a circuit area in the latter stage, it is also possible not to arrange the voltage conversion circuit 330. Furthermore, although the power consumption is reduced by the delay VCO circuit 360, the delay VCO circuit 360 may also be cut by a balance between reduction in power consumption and the circuit area. Furthermore, although the driving force is improved by the buffer circuit 370, the buffer circuit 370 may be deleted in a case where a load on an output node is not so large.

Figure 7:
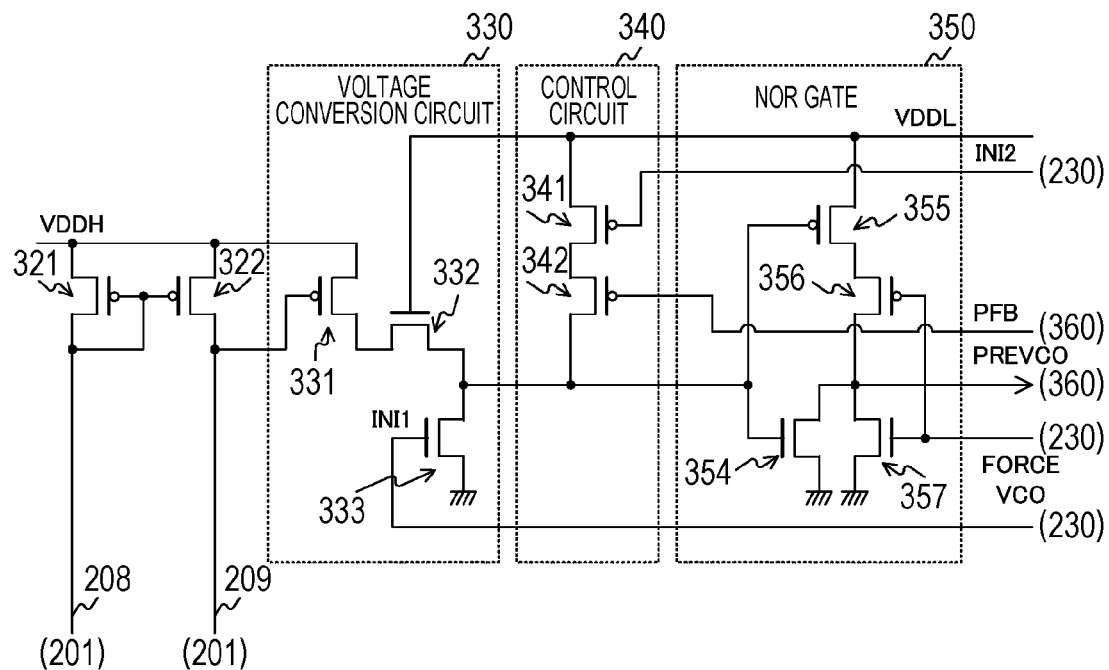
FIG. 7 is a circuit diagram illustrating a configuration example of a voltage conversion circuit, a control circuit, and a NOR gate in the first embodiment of the present technology.

FIG. 7 is a circuit diagram illustrating a configuration example of the voltage conversion circuit 330, the control circuit 340, and the NOR gate 350 in the first embodiment of the present technology.

The voltage conversion circuit 330 is provided with a p-type transistor 331 and n-type transistors 332 and 333. For example, MOS transistors are used as these transistors.

The p-type transistor 331 is connected in parallel with the p-type transistors 321 and 322 to the terminal of the power supply voltage VDDH. Furthermore, a gate of the p-type transistor 331 is connected to the drain of the p-type transistor 322.

The n-type transistors 332 and 333 are connected in series between the drain of the p-type transistor 331 and a terminal of a reference potential (such as a ground potential). Furthermore, a gate of the n-type transistor 332 is connected to a terminal of a power supply voltage VDDL lower than the power supply voltage VDDH, and a drive signal INI1 from the drive circuit 230 is input to a gate of the n-type transistor 333. Furthermore, a connection point of the n-type transistors 332 and 333 is connected to the control circuit 340 and the NOR gate 350.

Furthermore, the control circuit 340 is provided with p-type transistors 341 and 342. For example, MOS transistors are used as these transistors. The p-type transistors 341 and 342 are connected in series between the terminal of the power supply voltage VDDL and the connection point of the n-type transistors 332 and 333. A drive signal INI2 from the drive circuit 230 is input to a gate of the p-type transistor 341, and a feedback signal PFB from the delay VCO circuit 360 is input to a gate of the p-type transistor 342.

Furthermore, the NOR gate 350 is provided with p-type transistors 355 and 356 and n-type transistors 354 and 357. For example, MOS transistors are used as these transistors. The p-type transistors 355 and 356 are connected in series between the terminal of the power supply voltage VDDL and an output terminal of the NOR gate 350. The n-type transistors 354 and 357 are connected in parallel between the output terminal of the NOR gate 350 and a terminal of a reference potential (such as a ground potential).

Furthermore, gates of the n-type transistor 354 and the p-type transistor 355 are commonly connected to the control circuit 340. A drive signal FORCEVCO from the drive circuit 230 is input to gates of the n-type transistor 357 and the p-type transistor 356. The drive signal FORCEVCO is a signal for forcibly inverting the signal by the NOR gate 350 at the end of AD conversion to output the comparison result VCO. An output signal PREVCO of the NOR gate 350 is output from a connection point of the n-type transistor 357 and the p-type transistor 356 to the delay VCO circuit 360.

Note that a circuit configuration of the voltage conversion circuit 330, the control circuit 340, and the NOR gate 350 is not limited to the circuit illustrated in FIG. 7 as long as the functions described with reference to FIG. 6 may be realized.

Figure 8:
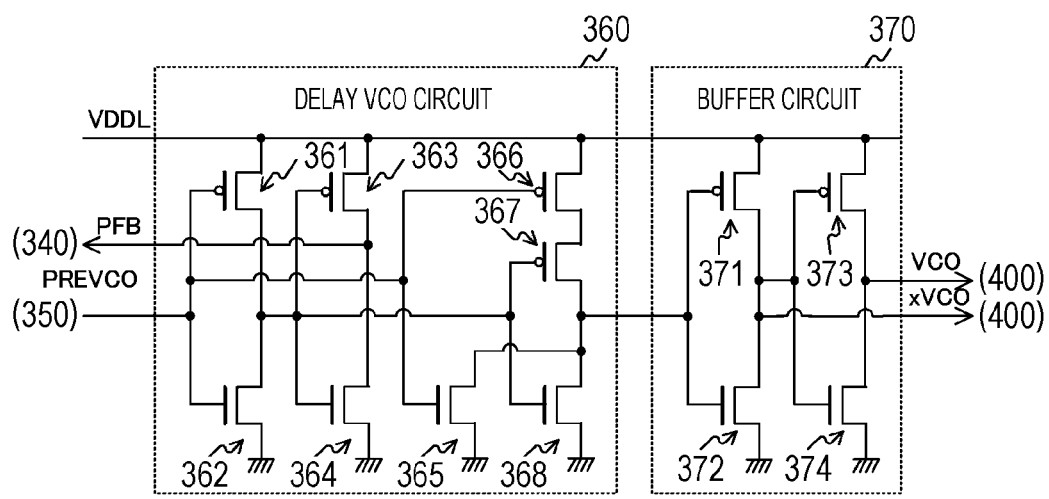
FIG. 8 is a circuit diagram illustrating a configuration example of a delay VCO circuit and a buffer circuit in the first embodiment of the present technology.

FIG. 8 is a circuit diagram illustrating a configuration example of the delay VCO circuit 360 and the buffer circuit 370 in the first embodiment of the present technology.

The delay VCO circuit 360 is provided with n-type transistors 362, 364, 365, and 368, and p-type transistors 361, 363, 366, and 367. The p-type transistor 361 and the n-type transistor 362 are connected in series between the terminal of the power supply voltage VDDL and a terminal of a reference potential (such as a ground potential). The output signal PREVCO from the NOR gate 350 is input to gates of the p-type transistor 361 and the n-type transistor 362. Furthermore, a connection point of the p-type transistor 361 and the n-type transistor 362 is connected to gates of the p-type transistor 363, the n-type transistor 364, the p-type transistor 367, and the n-type transistor 368.

The p-type transistor 363 and the n-type transistor 364 are connected in series between the terminal of the power supply voltage VDDL and a terminal of a reference potential. A connection point of the p-type transistor 363 and the n-type transistor 364 is connected to the control circuit 340, and the feedback signal PFB is output from the connection point.

The p-type transistors 366 and 367 are connected in series between the terminal of the power supply voltage VDDL and an output terminal of the delay VCO circuit 360. The n-type transistors 365 and 368 are connected in parallel between the output terminal of the delay VCO circuit 360 and a terminal of a reference potential.

The buffer circuit 370 is provided with p-type transistors 371 and 373 and n-type transistors 372 and 374. For example, MOS transistors are used as these transistors.

The p-type transistor 371 and the n-type transistor 372 are connected in series between the terminal of the power supply voltage VDDL and a terminal of a reference potential. Gates of the p-type transistor 371 and the n-type transistor 372 are connected to the output terminal of the delay VCO circuit 360. A connection point of the p-type transistor 371 and the n-type transistor 372 is connected to the storage unit 400, and an inverted signal xVCO of the comparison result VCO is output from this connection point.

The p-type transistor 373 and the n-type transistor 374 are connected in series between the terminal of the power supply voltage VDDL and a terminal of a reference potential. Gates of the p-type transistor 373 and the n-type transistor 374 are connected to the connection point of the p-type transistor 371 and the n-type transistor 372. A connection point of the p-type transistor 373 and the n-type transistor 374 is connected to the storage unit 400, and the comparison result VCO is output from this connection point.

Note that a circuit configuration of the delay VCO circuit 360 and the buffer circuit 370 is not limited to the circuit illustrated in FIG. 8 as long as the functions described with reference to FIG. 6 may be realized.

Figure 9:
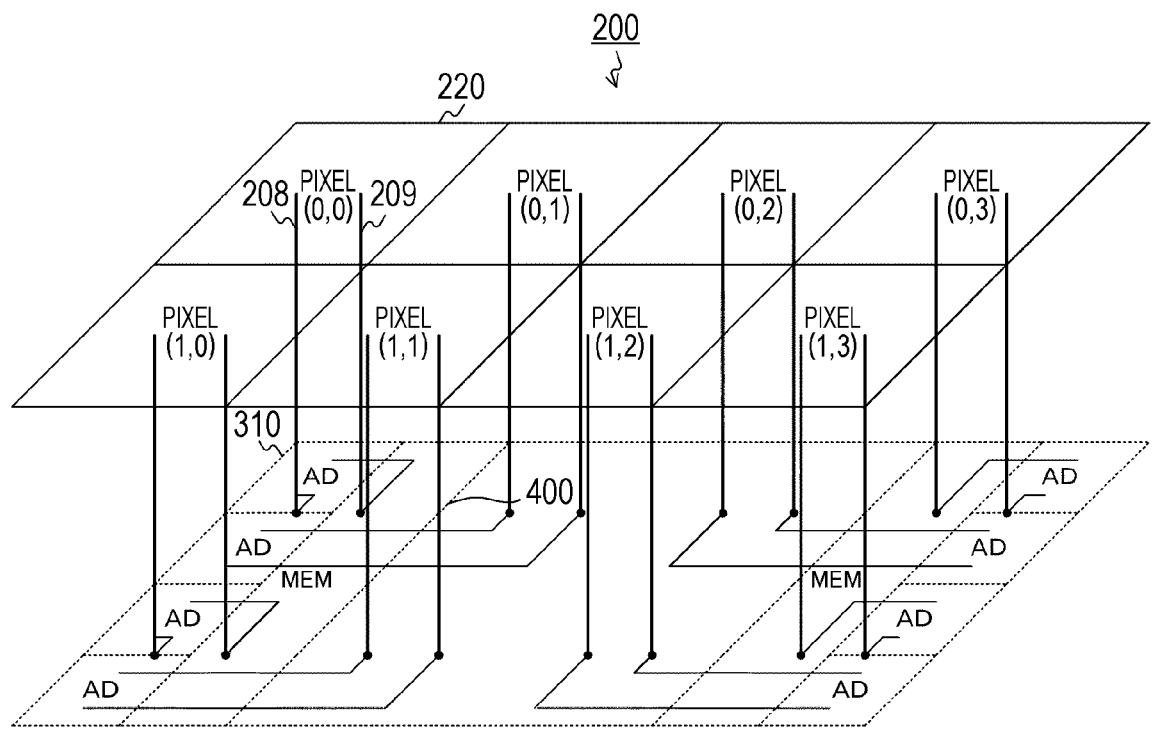
FIG. 9 is a perspective view illustrating an example of a connection relationship between the pixel and the AD conversion circuit in the first embodiment of the present technology.

FIG. 9 is a perspective view illustrating an example of a connection relationship between the pixel 220 and the AD conversion circuit 310 in the first embodiment of the present technology.

Coordinates of the pixel 220 in an X-th (X is an integer) row and a Y-th (Y is an integer) column in the pixel block 213 are set to (X,Y). Four pixels of coordinates (0,0), (0,1), (1,0), and (1,1) on a left side are connected to four AD conversion circuits 310 on the left side. Furthermore, four pixels of coordinates (0,2), (0,3), (1,2), and (1,3) on a right side are connected to four AD conversion circuits 310 on the right side. Note that, in the drawing, "AD" represents the AD conversion circuit 310, and "MEM" represents the storage unit 400. Out of the light reception chip 201 and the circuit chip 202, the light reception chip 201 is set to an upper side, and as illustrated in the drawing, the MEM (storage unit 400) including an arithmetic circuit is arranged immediately below the pixel array unit provided on the light reception chip 201.

[Configuration Example of Storage Unit]

Figure 10:
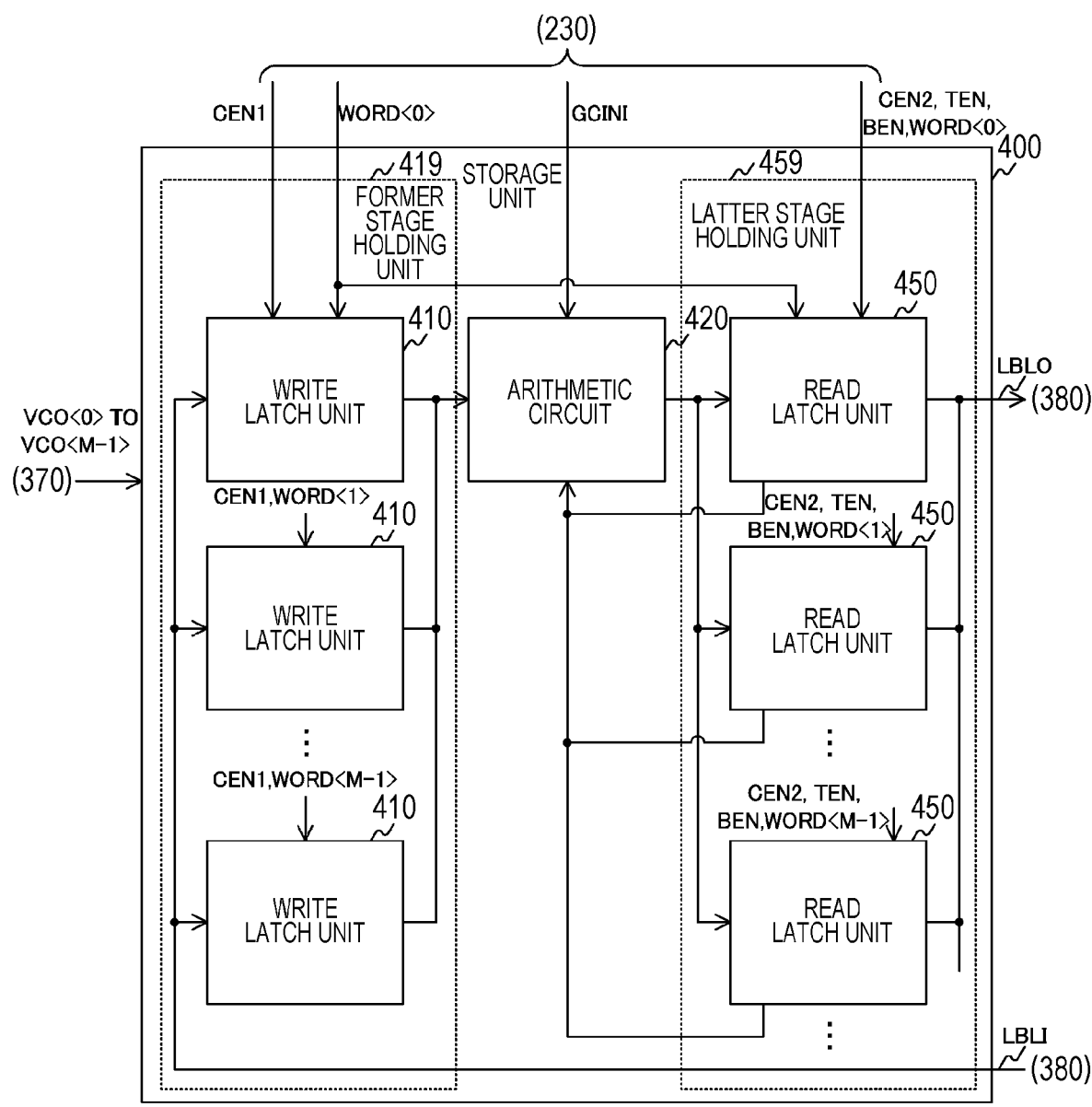
FIG. 10 is a block diagram illustrating a configuration example of a storage unit in the first embodiment of the present technology.

FIG. 10 is a block diagram illustrating a configuration example of the storage unit 400 in the first embodiment of the present technology. A former stage holding unit 419, an arithmetic circuit 420, and a latter stage holding unit 459 are arranged in the storage unit 400. A write latch unit 410 is arranged for each AD conversion circuit 310 (in other words, each pixel) in the former stage holding unit 419. For example, in a case where M (M is an integer) AD conversion circuits 310 are connected to the storage unit 400, M write latch units 410 are arranged. Furthermore, read latch units 450 as many as the write latch units 410 are arranged in the latter stage holding unit 459. These write latch units 410 and read latch units 450 are realized by, for example, static (S) latches. Note that, a delay (D) latch with a capacitance may also be adopted.

The write latch unit 410 holds the time code when the comparison result VCO from the corresponding AD conversion circuit 310 is inverted. The time code when the comparison result VCO of the reset level and the reference signal RMP is inverted is held as the reset data obtained by AD conversion of the reset level. Furthermore, the time code when the comparison result VCO of the signal level and the reference signal RMP is inverted is held as the signal data obtained by AD conversion of the signal level.

Furthermore, assuming that a comparison result of an m-th (m is an integer from 0 to M−1) AD conversion circuit 310 is VCO<m>, the comparison result VCO<m> is input to an m-th write latch unit 410. Moreover, all the write latch units 410 are connected to the data transfer circuit 380 via a local bit line LBLI, and the time code is input to the write latch unit 410 via the local bit line LBLI.

Furthermore, the drive circuit 230 inputs a drive signal WORD<m> to the m-th write latch unit 410 and inputs an N-bit (N is an integer) drive signal CEN1 to all the write latch units 410. The drive signal WORD<m> is a signal that drives any one of the M write latch units 410 and any one of the M read latch units 450. Furthermore, the drive signal CEN1 is a signal that causes an output of any of N bits.

The drive circuit 230 drives the M write latch units 410 in order by the drive signal WORD<m>, and allows the same to output the held data bit by bit to the arithmetic circuit 420 by the drive signal CEN1.

The arithmetic circuit 420 converts the code format and performs the CDS processing for obtaining the difference between the reset data and the signal data. The arithmetic circuit 420 converts the code format of the reset data from the m-th write latch unit 410 and allows the corresponding read latch unit 450 to hold the same as it is. Then, the arithmetic circuit 420 converts the code format of the signal data from the m-th write latch unit 410 and obtains the difference from the reset data in the binary code held in the corresponding read latch unit 450. The arithmetic circuit 420 outputs the difference as the pixel data to the corresponding read latch unit 450.

The read latch unit 450 holds the reset data and outputs the same to the arithmetic circuit 420, and holds the pixel data and outputs the same to the data transfer circuit 380.

Furthermore, the drive circuit 230 inputs the drive signal WORD<m> to the m-th read latch unit 450 and inputs drive signals CEN2, TEN, and BEN to all the read latch units 450. The drive signal CEN2 is a signal that causes an output of any of N bits. The drive signal TEN is a signal that causes an output of the pixel data to the data transfer circuit 380. The drive signal BEN is a signal that causes an output of the reset data to the arithmetic circuit 420.

The drive circuit 230 allows the m-th read latch unit 450 to hold the data by the drive signal WORD<m>. Furthermore, the drive circuit 230 allows the same to output the reset data bit by bit to the arithmetic circuit 420 by the drive signal BEN, and allows the same to output all the bits of the pixel data at the same time to the data transfer circuit 380 by the drive signal TEN.

[Configuration Example of Write Latch Unit]

Figure 11:
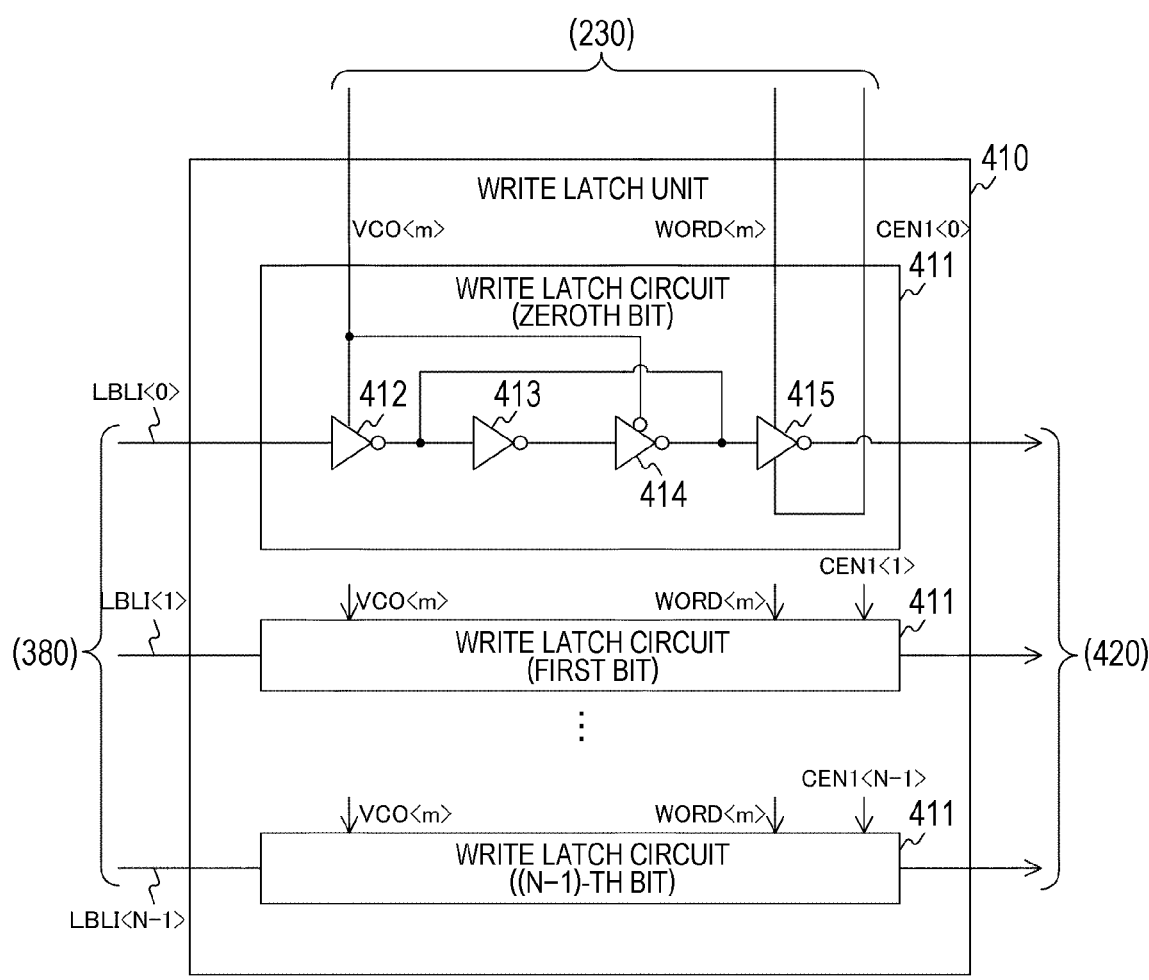
FIG. 11 is a circuit diagram illustrating a configuration example of a write latch unit in the first embodiment of the present technology.

FIG. 11 is a circuit diagram illustrating a configuration example of the write latch unit 410 in the first embodiment of the present technology. The write latch unit 410 is provided with N write latch circuits 411. Each of the write latch circuits 411 is provided with inverters 412 to 415. An n-th write latch circuit 411 (n is an integer from 0 to N−1) holds an n-th bit of the time code.

Furthermore, the local bit line LBLI includes N signal lines, and the n-th write latch circuit 411 is connected to an n-th signal line LBLI<n> of the local bit line LBLI. An n-th bit CEN1<n> of the drive signal CEN1 is input to the n-th write latch circuit 411. The drive signal WORD<m> and the comparison result VCO<m> are input to all the write latch circuits 411.

The inverter 412 inverts the n-th bit of the time code from the signal line LBLI<n> in a case where the comparison result VCO<m> is at a high level. The inverter 412 supplies the inverted signal to the inverter 413 and the inverter 415.

The inverter 413 inverts the input signal and supplies the same to the inverter 414.

The inverter 414 inverts the input signal in a case where the comparison result VCO<m> is at a low level. The inverter 414 supplies the inverted signal to the inverters 413 and 415.

The inverter 415 inverts the input signal and outputs the same to the arithmetic circuit 420 in a case where both the drive signals WORD<m> and CEN1<n> are at a high level.

Note that the circuit configuration of the write latch circuit 411 is not limited to the circuit illustrated in FIG. 11 as long as the functions described with reference to FIG. 10 may be realized.

[Configuration Example of Arithmetic Circuit]

Figure 12:
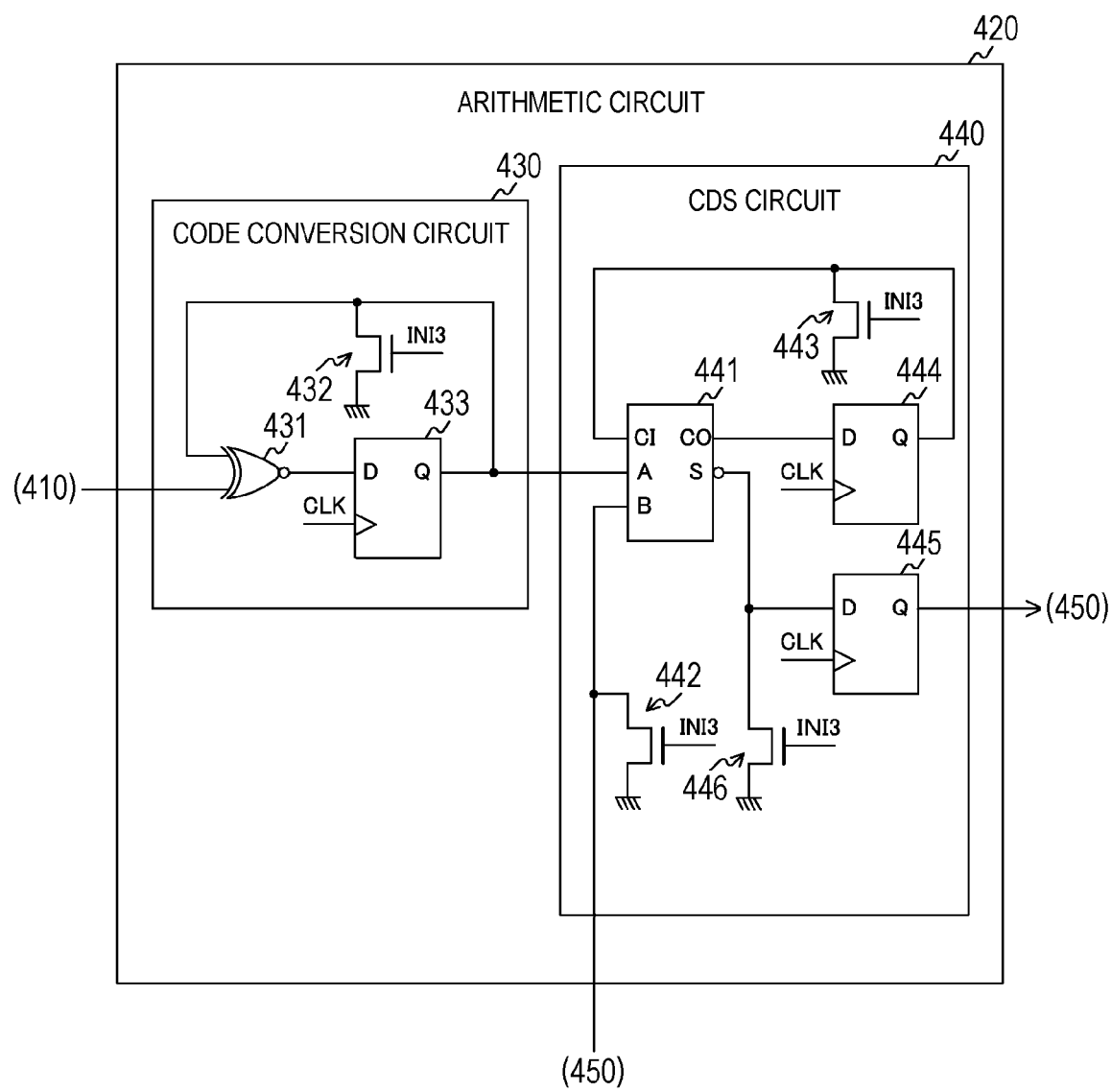
FIG. 12 is a circuit diagram illustrating a configuration example of an arithmetic circuit in the first embodiment of the present technology.

FIG. 12 is a circuit diagram illustrating a configuration example of the arithmetic circuit 420 in the first embodiment of the present technology. The arithmetic circuit 420 is provided with a code conversion circuit 430 and a CDS circuit 440.

The code conversion circuit 430 converts the code format of the input data bit by bit from the Gray code to the binary code. By converting to the binary code, the CDS circuit 440 in the latter stage may perform a differential arithmetic operation. The code conversion circuit 430 is provided with an (exclusive negative OR (XNOR) gate 431, an n-type transistor 432, and a flip-flop 433. For example, an MOS transistor is used as the n-type transistor 432.

The XNOR gate 431 outputs an exclusive negative OR of an n-th bit of the data from the write latch unit 410 and a bit from the flip-flop 433 to an input terminal D of the flip-flop 433.

The flip-flop 433 holds a bit from the XNOR gate 431 in synchronization with a predetermined clock signal CLK. The flip-flop 433 outputs the held bit from an output terminal Q to the XNOR gate 431 and the CDS circuit 440.

The n-type transistor 432 is inserted between the output terminal Q of the flip-flop 433 and a terminal of a reference potential. Furthermore, a drive signal INI3 from the drive circuit 230 is input to a gate of the n-type transistor 432. The drive signal INI3 is a signal for initializing the arithmetic circuit 420.

Note that a circuit configuration of the code conversion circuit 430 is not limited to the circuit illustrated in the drawing as long as the code conversion may be performed. Furthermore, although the code conversion circuit 430 converts the Gray code to the binary code, the code format before and after the conversion is not limited to this combination. Furthermore, although the code conversion circuit 430 is arranged in the arithmetic circuit 420, in a case where the code conversion is unnecessary, such as in a case where the time code is the binary code, it is also possible that the code conversion circuit 430 is not arranged.

The CDS circuit 440 performs the CDS processing bit by bit. The CDS circuit 440 is provided with a full adder 441, n-type transistors 442, 443 and 446, and flip-flops 444 and 445.

The full adder 441 adds a bit input to an input terminal A and a bit input to an input terminal B. The input terminal A is connected to the code conversion circuit 430, and the input terminal B is connected to the read latch unit 450. The full adder 441 adds an addition result of the input bits and a carry input, outputs the result from an output terminal S to the flip-flop 445, and outputs a carry bit from an output terminal C0 to the flip-flop 444.

The flip-flop 444 holds the carry bit from the full adder 441 in synchronization with a clock signal CLK. The flip-flop 444 outputs the held bit from an output terminal Q to a carry input terminal CI of the full adder 441.

The flip-flop 445 holds the output bit from the full adder 441 in synchronization with the clock signal CLK. The flip-flop 445 outputs the held bit from an output terminal Q to the read latch unit 450. By arranging the flip-flop 445, the arithmetic circuit 420 may simultaneously execute the code conversion and the CDS processing.

Note that although it is possible that the flip-flop 445 is not arranged, but in this case, it is inevitable that the reset data is read and a CDS processing result (pixel data) is written in the bit of the same digit. Therefore, it is necessary to add a primary latch of the same bit length as that of the read latch unit 450.

The n-type transistor 442 is inserted between the input terminal B of the full adder 441 and a terminal of a reference potential. Furthermore, the drive signal INI3 from the drive circuit 230 is input to a gate of the n-type transistor 442.

The n-type transistor 443 is inserted between the output terminal Q of the flip-flop 444 and a terminal of a reference potential. Furthermore, the drive signal INI3 is input to a gate of the n-type transistor 443.

The n-type transistor 446 is inserted between an output terminal S of the full adder 441 and a terminal of a reference potential. Furthermore, the drive signal INI3 is input to a gate of the n-type transistor 446.

Note that a circuit configuration of the CDS circuit 440 is not limited to the circuit illustrated in the drawing as long as the CDS processing may be performed.

Furthermore, although the arithmetic circuit 420 performs the code conversion and the CDS processing, this may also perform other processing. For example, the arithmetic circuit 420 may further perform pixel addition, blurring processing, contour extraction processing, embossing processing and the like to be described later.

[Configuration Example of Read Latch Unit]

Figure 13:
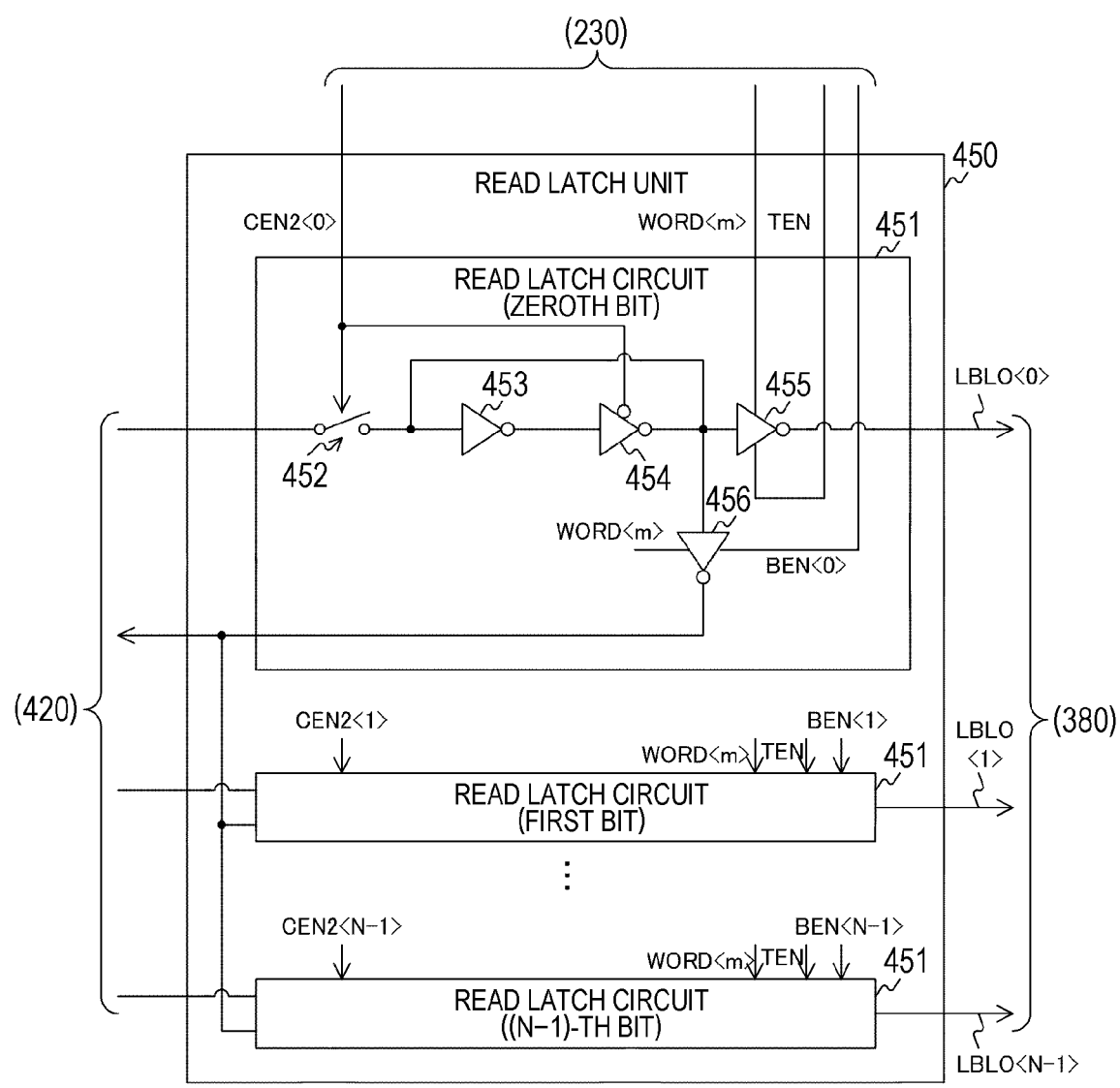
FIG. 13 is a circuit diagram illustrating a configuration example of a read latch unit in the first embodiment of the present technology.

FIG. 13 is a circuit diagram illustrating a configuration example of the read latch unit 450 in the first embodiment of the present technology. The read latch unit 450 is provided with N read latch circuits 451. Each of the read latch circuits 451 is provided with a switch 452 and inverters 453 to 456.

Furthermore, a local bit line LBLO includes N signal lines, and an n-th read latch circuit 451 is connected to an n-th signal line LBLO<n> of the local bit line LBLO. An n-th bit CEN2<n> of the drive signal CEN2 and an n-th bit BEN<n> of the BEN are input to the n-th read latch circuit 451. The drive signals WORD<m> and TEN are input to all the read latch circuits 451.

The switch 452 opens and closes a path between the arithmetic circuit 420 and input terminals of the inverters 453, 455, and 456 according to the drive signal CEN2<n>. For example, in a case where the drive signal CEN2<n> is at a high level, the switch 452 shifts to a closed state, and in a case where this is at a low level, this shifts to an opened state.

The inverter 453 inverts the signal from the switch 452 and outputs the same to the inverter 454.

The inverter 454 inverts the signal from the inverter 453 in a case where an inverted value of the drive signal CEN2<n> is at a high level. The inverter 454 outputs the inverted signal to the inverters 453, 455, and 456.

The inverter 455 inverts the input signal and outputs the same to the data transfer circuit 380 via the signal line LBLO<n> in a case where both the drive signals WORD<m> and TEN are at a high level.

The inverter 456 inverts the input signal and outputs the same to the arithmetic circuit 420 in a case where both the drive signals WORD<m> and BEN<n> are at a high level.

Note that a circuit configuration of the read latch circuit 451 is not limited to the circuit illustrated in FIG. 13 as long as the functions described with reference to FIG. 10 may be realized.

[Configuration Example of Data Transfer Circuit]

Figure 14:
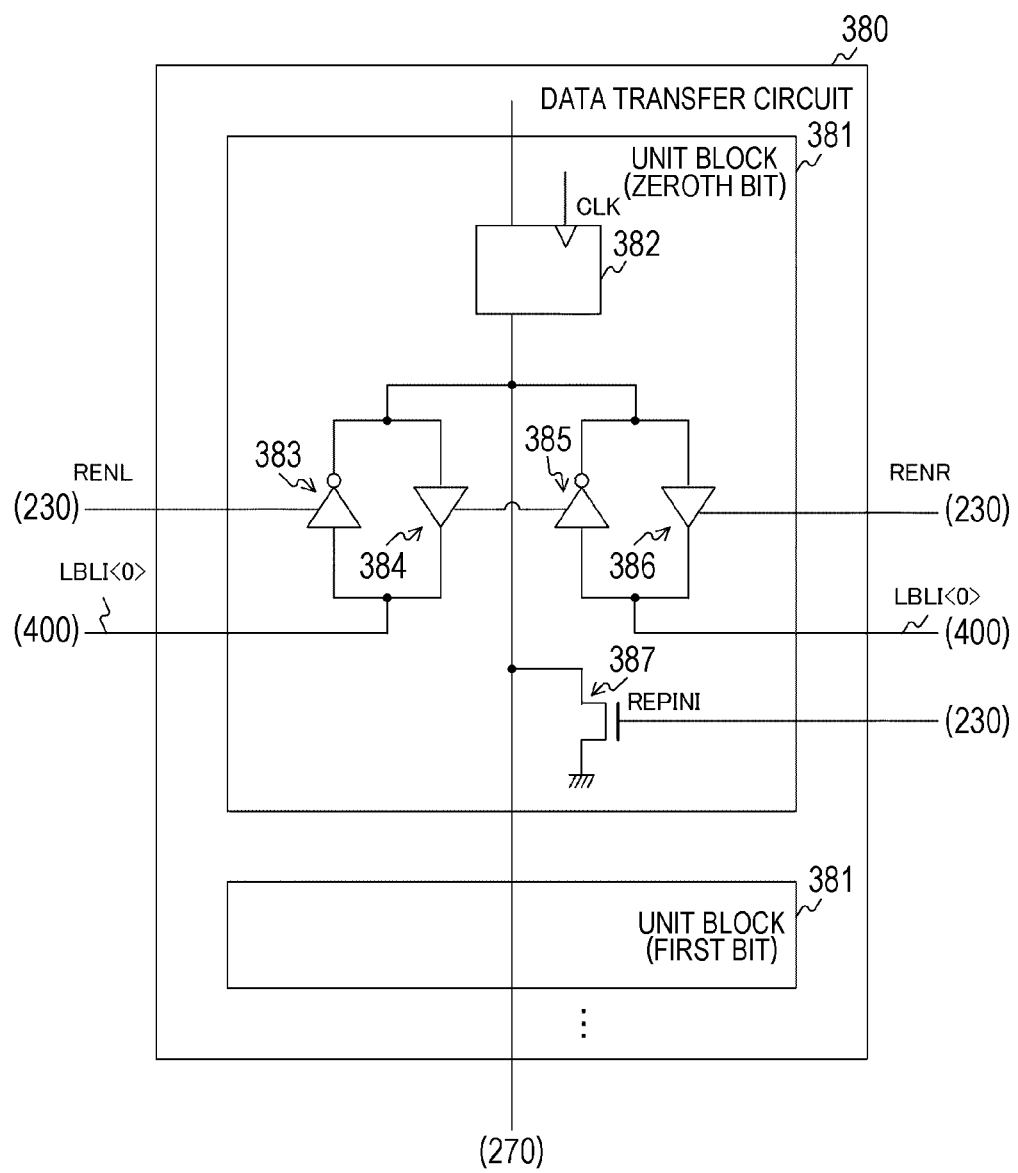
FIG. 14 is a circuit diagram illustrating a configuration example of a data transfer circuit in the first embodiment of the present technology.

FIG. 14 is a circuit diagram illustrating a configuration example of the data transfer circuit 380 in the first embodiment of the present technology. The data transfer circuit 380 is provided with a read lane being a circuit for transferring the pixel data and a write lane being a circuit for transferring the time code. Among them, the read lane is provided with N unit blocks 381 for each cluster 300. Each of the unit blocks 381 is provided with a flip-flop 382, inverters 383 and 385, buffers 384 and 386, and an n-type transistor 387. For example, an MOS transistor is used as the n-type transistor 387. Note that the write lane is not illustrated in the drawing.

The flip-flop 382 holds the bit from the former stage according to the clock signal CLK. The flip-flop 382 outputs the held bit to the buffers 384 and 386 and the unit block 381 in the latter stage.

An input terminal of the inverter 383 and an output terminal of the buffer 384 are connected to the storage unit 400 on the left side via the local bit line LBLI<n>.

The inverter 383 inverts the input signal according to a drive signal RENL from the drive circuit 230, and outputs the same to the unit block 381 in the latter stage. The drive signal RENL is a signal for causing transfer of the pixel data from the storage unit 400 on the left side.

An input terminal of the inverter 385 and an output terminal of the buffer 386 are connected to the storage unit 400 on the right side via the local bit line LBLI<n>.

The inverter 385 inverts the input signal according to a drive signal RENR from the drive circuit 230, and outputs the same to the unit block 381 in the latter stage. The drive signal RENR is a signal for causing transfer of the pixel data from the storage unit 400 on the right side.

The n-type transistor 387 is inserted between an output terminal of the flip-flop 382 and a terminal of a reference potential. Furthermore, a drive signal REPINI from the drive circuit 230 is input to a gate of the n-type transistor 387. The drive signal REPINI is a signal for initializing the data transfer circuit 380. Note that although the n-type transistor 387 is used as a transistor for initialization, it is also possible to initialize to a power supply level by the p-type transistor in place of this. Furthermore, it is also possible to initialize to an arbitrary value by using both the n-type transistor and the p-type transistor.

Note that the write lane that transfers the time code includes a shift register and the like as is the case with the circuit illustrated in the drawing.

Figure 15:
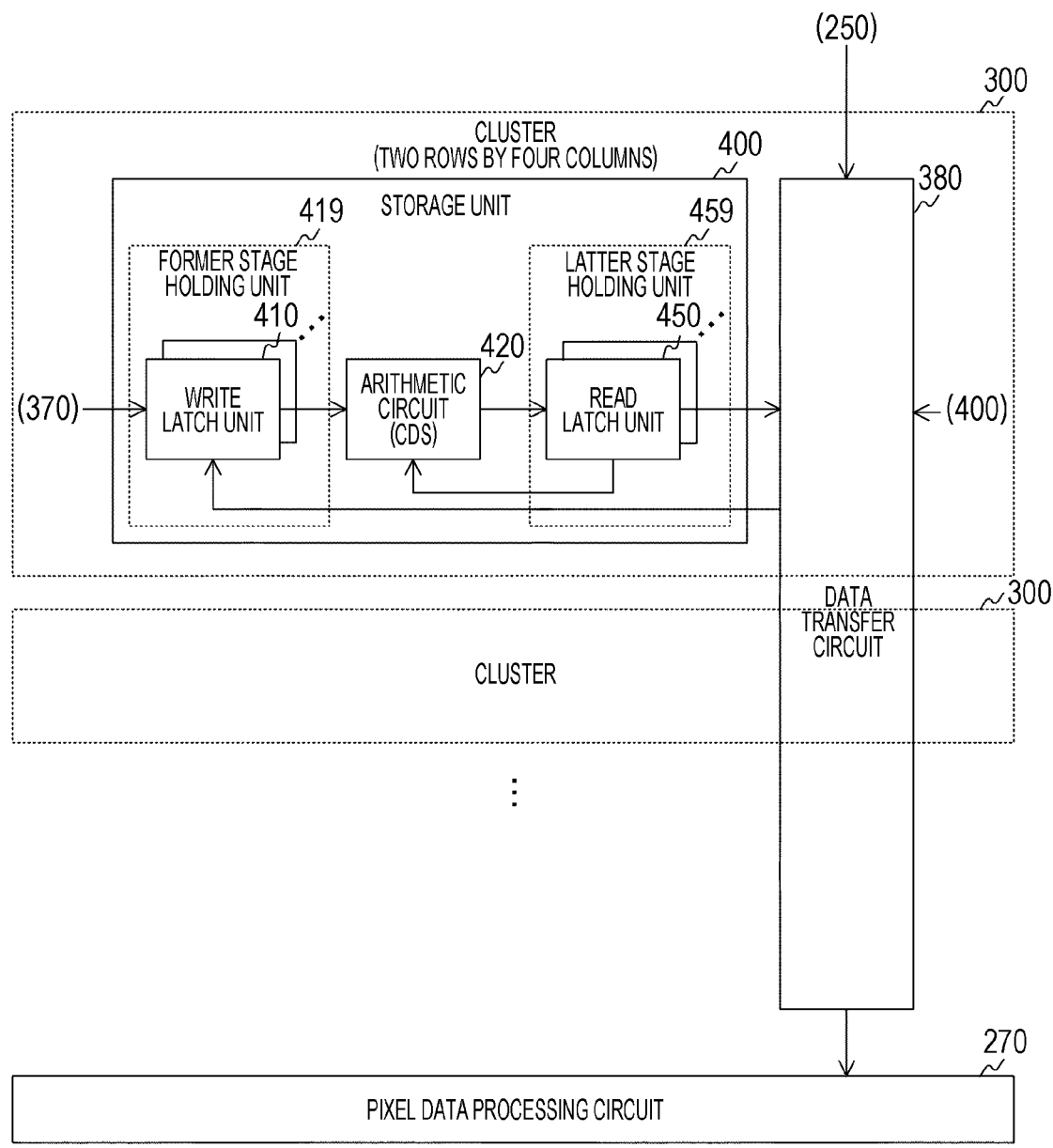
FIG. 15 is a view for illustrating arrangement of an arithmetic circuit in the first embodiment of the present technology.

FIG. 15 is a view for illustrating arrangement of the arithmetic circuit 420 in the first embodiment of the present technology. The data transfer circuit 380 that transfers the time code and the pixel data in a column direction is arranged for each column of the clusters 300.

Furthermore, in the cluster 300, the storage units 400 are arranged on the right side and the left side of the data transfer circuit 380. The storage unit 400 is provided with the former stage holding unit 419, the arithmetic circuit 420, and the latter stage holding unit 459.

The former stage holding unit 419 holds the reset data and the signal data in order. The arithmetic circuit 420 obtains the difference between the reset data and the signal data and outputs the same to the latter stage holding unit 459 as the pixel data. The latter stage holding unit 459 holds the reset data and outputs the same to the arithmetic circuit 420, and holds the pixel data and outputs the same to the data transfer circuit 380. Note that a circuit including the former stage holding unit 419 and the latter stage holding unit 459 is an example of a holding unit recited in claims. Furthermore, a circuit including the write latch unit 410 and the read latch unit 450 is an example of a holding circuit recited in claims.

Here, a comparative example is configured in which the arithmetic circuit 420 is not arranged in the storage unit 400 but is arranged in the pixel data processing circuit 270. In this comparative example, the storage unit 400 needs to output the reset data and the signal data to the data transfer circuit 380 in order for each pixel, and the data transfer circuit 380 needs to transfer them to the pixel data processing circuit 270 in order.

In contrast, in a configuration in which the arithmetic circuit 420 is arranged in the storage unit 400, the arithmetic circuit 420 obtains the difference between the reset data and the signal data (pixel data), and the data transfer circuit 380 transfers the pixel data. Therefore, the number of times of data transfer per pixel is made half, and a transfer period may be shortened. Furthermore, the power consumption of the data transfer circuit 380 may be reduced. Moreover, a circuit scale of the storage unit 400, the data transfer circuit 380, and the pixel data processing circuit 270 may be reduced.

[Operation Example of Solid-State Imaging Element]

Figure 16:
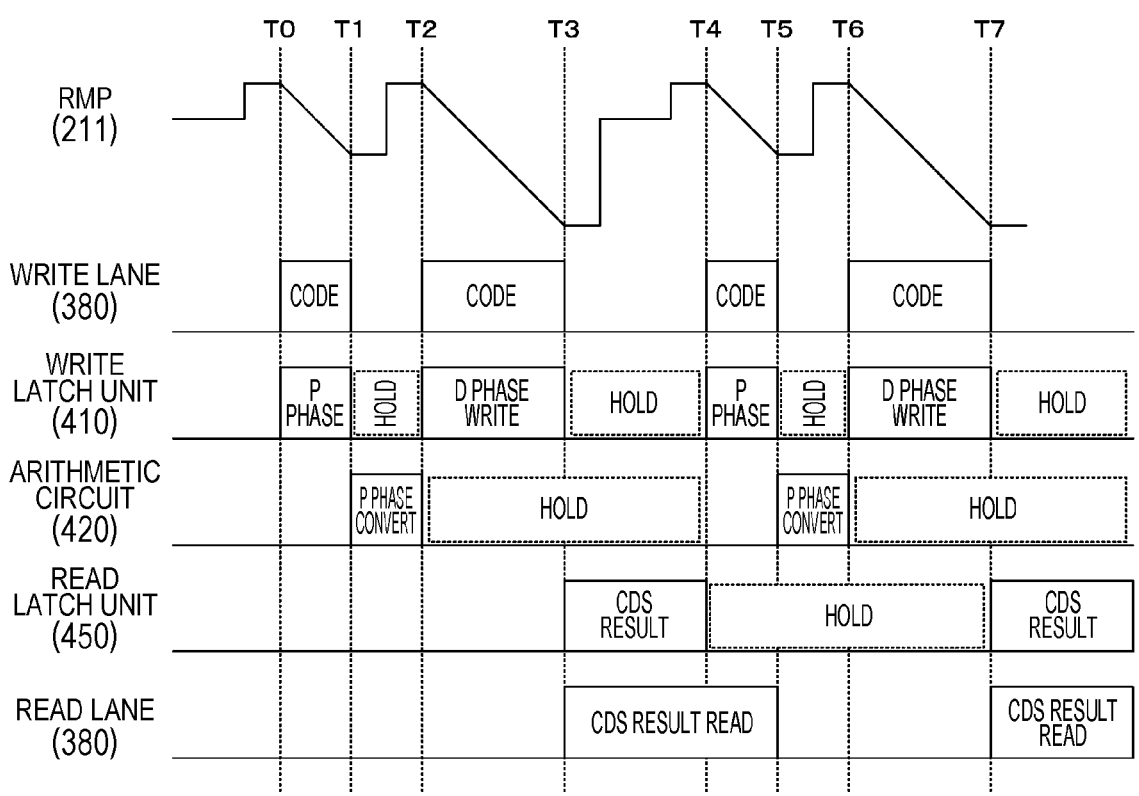
FIG. 16 is a timing chart illustrating an example of an operation of a cluster and the data transfer circuit in the first embodiment of the present technology.

FIG. 16 is a timing chart illustrating an example of an operation of the cluster 300 and the data transfer circuit 380 in the first embodiment of the present technology. The DAC 211 supplies the reference signal RMP.

The reference signal RMP changes in a slope shape over a period from timing T0 to timing T1 immediately before the end of exposure. The write lane in the data transfer circuit 380 transfers the time code indicating the time of this period, and the transferred time code is written in the write latch unit 410 as the reset data. In the drawing, "P phase" represents the reset data.

In a period from timing T1 to timing T2, the write latch unit 410 holds the reset data (P phase), and the arithmetic circuit 420 converts the code format thereof from the Gray code to the binary code.

Then, the reference signal RMP changes in a slope shape over a period from timing T2 to timing T3 immediately after the end of exposure. The write lane transfers the time code, and the transferred time code is written in the write latch unit 410 as the signal data. In the drawing, "D phase" represents the signal data.

The write latch unit 410 holds the signal data (D phase) in a period from timing T3 to timing T4. In contrast, the arithmetic circuit 420 allows the read latch unit 450 to hold the reset data (P phase) in a period from timing T2 to timing T4. Furthermore, the arithmetic circuit 420 performs the CDS processing in the period from timing T3 to timing T4, and writes the result in the read latch unit 450.

After timing T4, the above-described processing is repeatedly executed. Furthermore, the read latch unit 450 holds the pixel data being the result of the CDS processing from timing T4 to timing T7, and the read lane in the data transfer circuit 380 reads to transfer the result of the CDS processing (pixel data) from timing T3 to timing T5.

Figure 17:
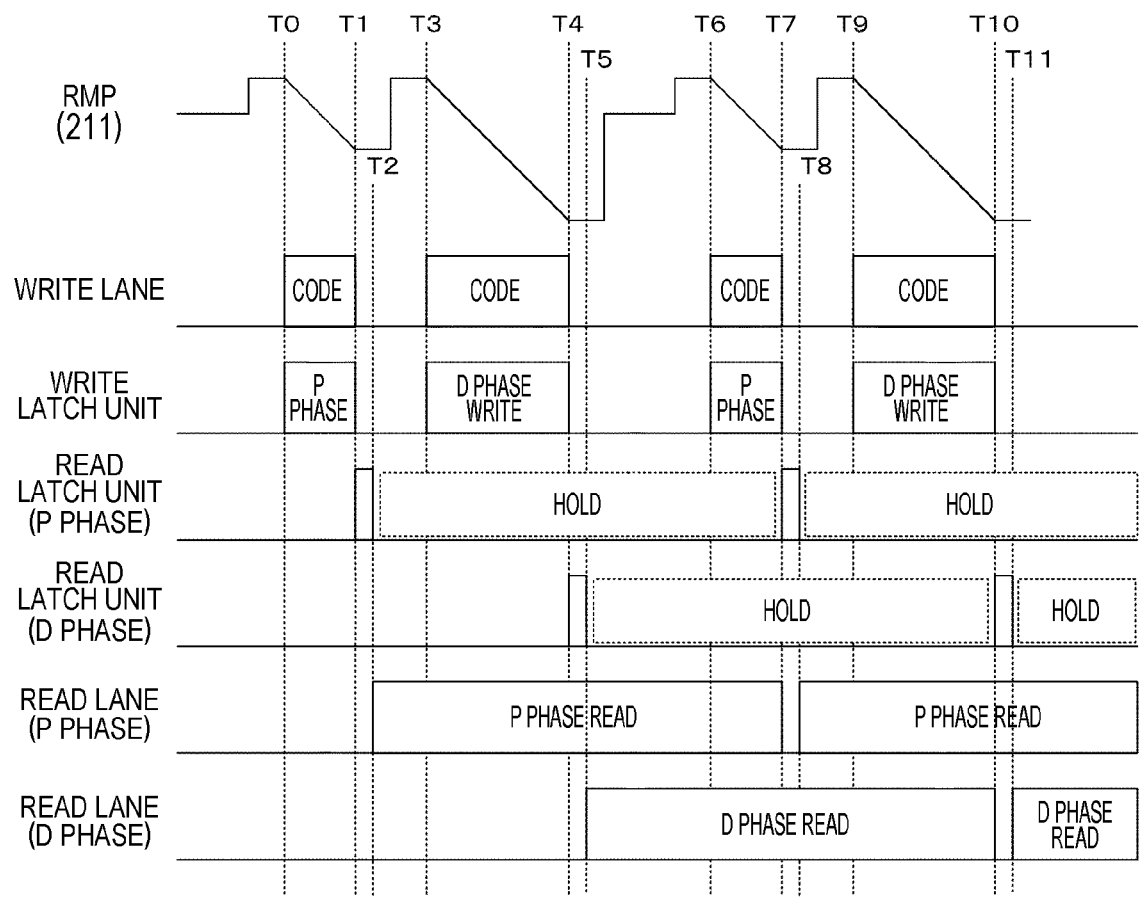
FIG. 17 is a timing chart illustrating an example of an operation of a cluster and a data transfer circuit in a comparative example.

FIG. 17 is a timing chart illustrating an example of an operation of the cluster 300 and the data transfer circuit 380 in the comparative example in which the CDS circuit is arranged in the latter stage of the data transfer circuit 380. Furthermore, in this comparative example, the read latch unit that holds the reset level (P phase) and the read latch unit that holds the signal level (D phase) are arranged separately. Furthermore, in the data transfer circuit 380, the read lane that transfers the reset level and the read lane that transfers the signal level are separately arranged.

The reference signal RMP changes in a slope shape over a period from timing T0 to timing T1 immediately before the end of exposure. The write lane transfers the time code, and the transferred time code is written in the write latch unit 410 as the reset data (P phase).

The code format of the reset data is converted in a period from timing T1 to timing T2 and written in the read latch unit for the reset data (P phase). In a period from timing T1 to timing T7, the read lane for the reset level reads to transfer the reset data.

Then, the reference signal RMP changes in a slope shape over a period from timing T3 to timing T4 immediately after the end of exposure. The write lane transfers the time code, and the transferred time code is written in the write latch unit as the signal data (D phase).

The code format of the signal data is converted in a period from timing T4 to timing T5 and written in the read latch unit for the signal data (D phase). In a period from timing T5 to timing T10, the read lane for the signal level reads to transfer the signal data. After timing T6, similar processing is repeatedly executed.

As illustrated in the drawing, in the configuration in which the CDS circuit is arranged in the latter stage of the data transfer circuit 380, the data transfer circuit 380 needs to transfer the reset level and the signal level for each pixel, so that the number of times of transfer increases. Furthermore, it is necessary to separately arrange the read latch unit that holds the reset level (P phase) and the read latch unit that holds the signal level (D phase), so that the circuit scale of the storage unit 400 increases. Furthermore, it is necessary to separately arrange the read lane that transfers the reset level and the read lane that transfers the signal level, so that the circuit scale of the data transfer circuit 380 increases.

Figure 18:
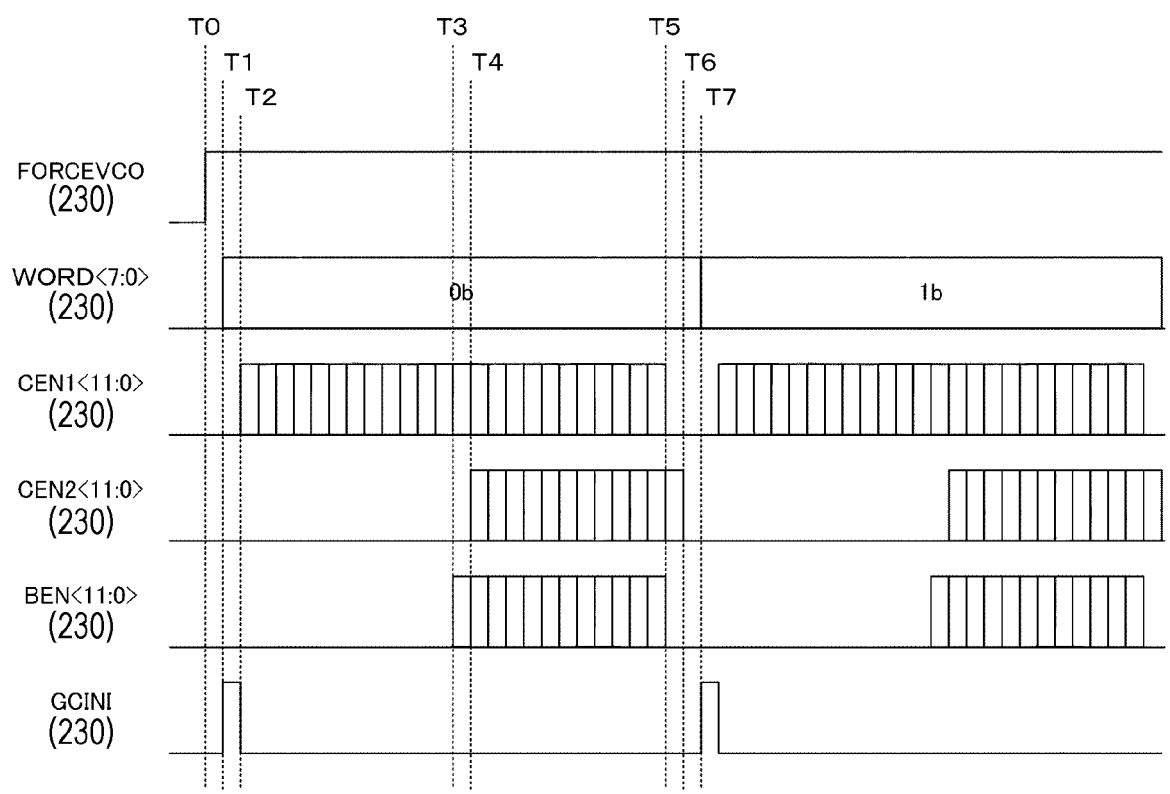
FIG. 18 is a timing chart illustrating an example of arithmetic control in the first embodiment of the present technology.

FIG. 18 is a timing chart illustrating an example of arithmetic control in the first embodiment of the present technology. At timing T0 when the time code is held, the drive circuit 230 sets the drive signal FORCEVCO at a high level to output the comparison result VCO.

Furthermore, in a period from timing T1 to timing T2, the drive circuit 230 initializes the arithmetic circuit 420 by setting a drive signal GCINI at a high level.

Furthermore, in a period from timing T1 to timing T7, the drive circuit 230 drives the write latch unit 410 and the read latch unit 450 corresponding to a zeroth pixel in the cluster 300 by the eight-bit drive signal WORD<m>.

From timing T2 to timing T3, the drive circuit 230 drives the write latch units 410 from the 11th bit to the zeroth bit in order by the 12-bit drive signal CEN<n>. Therefore, the reset data is written. From timing T3 to timing T5, the drive circuit 230 drives the write latch units 410 from the zeroth bit to the 11th bit in order by the drive signal CEN1<N>. Therefore, the signal data is written.

Furthermore, from timing 14 to timing T6, the drive circuit 230 drives the read latch units 450 from the zeroth bit to the 11th bit in order by the 12-bit drive signal CEN2<n>. Therefore, the reset data is output to the arithmetic circuit 420.

From timing T3 to timing T5, the drive circuit 230 drives the read latch units 450 from the zeroth bit to the 11th bit in order by the drive signal BEN<N>. Therefore, the pixel data is written.

Figure 19:
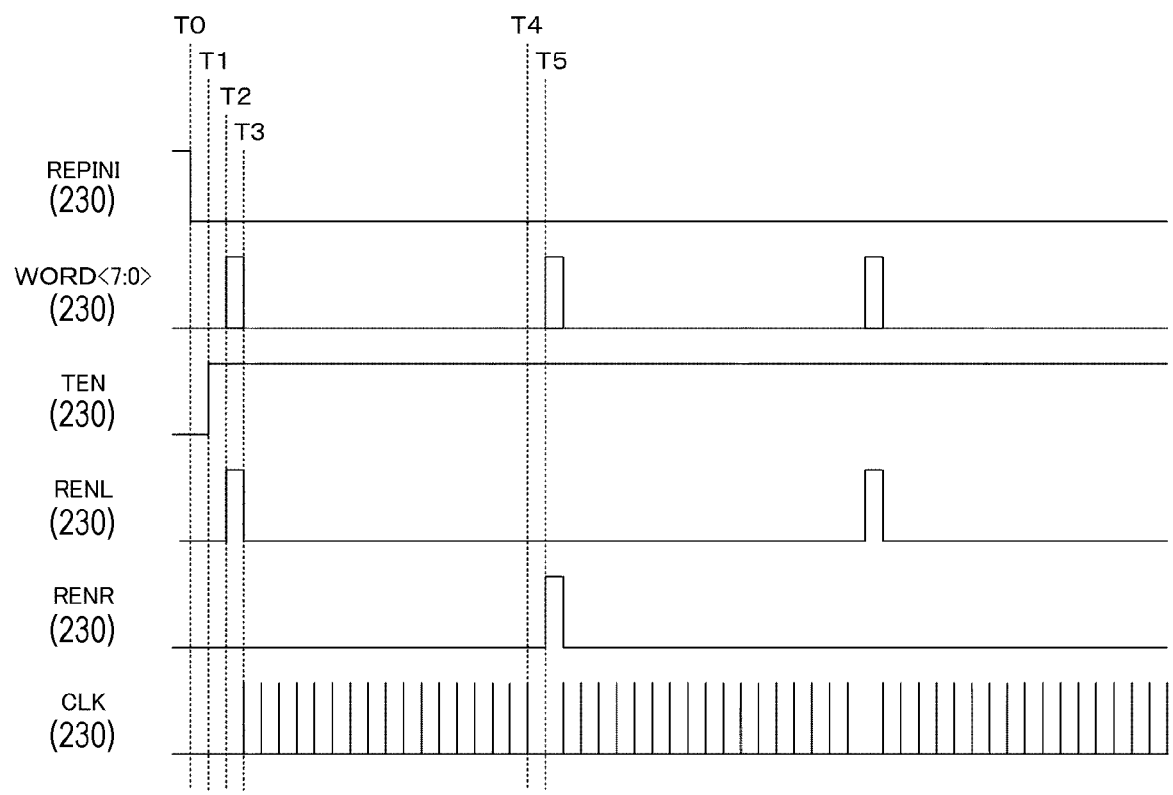
FIG. 19 is a timing chart illustrating an example of read control in the first embodiment of the present technology.

FIG. 19 is a timing chart illustrating an example of read control in the first embodiment of the present technology. At timing T0, the drive circuit 230 sets the drive signal REPINI at a low level and cancels the initialization of the data transfer circuit 380.

Furthermore, the drive circuit 230 sets the drive signal TEN at a high level to start outputting the pixel data at timing T1. From timing T2 to timing T3, the drive circuit 230 drives the read latch unit 450 corresponding to the zeroth pixel by the drive signal WORD<m>, and starts transferring the pixel data from the left side by the drive signal RENL. The drive circuit 230 supplies the clock signal CLK to transfer the pixel data from timing T3 to timing T4.

A timing T5, the drive circuit 230 drives the read latch unit 450 corresponding to the first pixel by the drive signal WORD<m>, and starts transferring the pixel data from the right side by the drive signal RENR.

Figure 20:
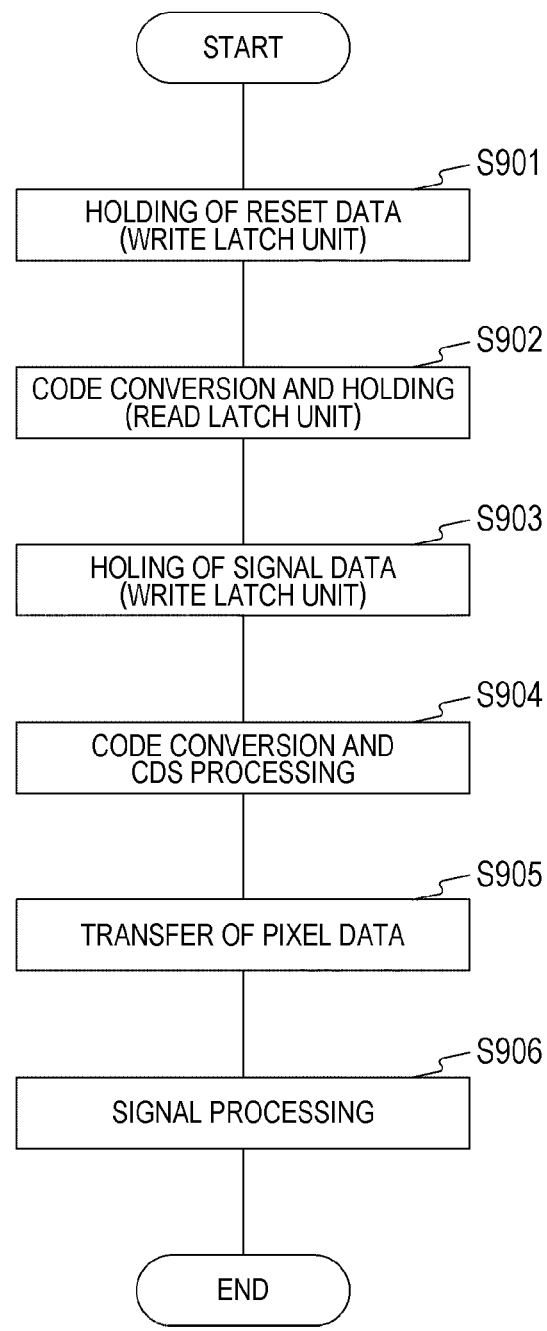
FIG. 20 is a flowchart illustrating an example of an operation of a solid-state imaging element in the first embodiment of the present technology.

FIG. 20 is a flowchart illustrating an example of an operation of the solid-state imaging element 200 in the first embodiment of the present technology. This operation starts, for example, when a predetermined application for imaging the image data is executed.

Immediately before the end of exposure, the write latch unit 410 holds the reset data of the Gray code (step S901). The arithmetic circuit 420 converts the code of the reset data to the binary code, and the read latch unit 450 holds the converted reset data (step S902).

Subsequently, immediately after the end of exposure, the write latch unit 410 holds the signal data of the Gray code (step S903). The arithmetic circuit 420 converts the code of the signal data to the binary code and generates the pixel data by the CDS processing (step S904).

The data transfer circuit 380 transfers the pixel data (step S905), and the pixel data processing circuit 270 performs signal processing on the pixel data (step S906). After step S906, the solid-state imaging element 200 ends the operation for imaging.

In this manner, according to the first embodiment of the present technology, the arithmetic circuit 420 obtains the difference between the reset data and the signal data, and the data transfer circuit 380 transfers the difference, so that the number of times of transfer may be reduced as compared with a case of transferring the reset data and the signal data.

2. SECOND EMBODIMENT

In the first embodiment described above, the arithmetic circuit 420 performs the code conversion and the CDS processing bit by bit, but the larger the data size of the data to be processed, the longer the delay time required for the processing. An arithmetic circuit 420 in a second embodiment is different from that in the first embodiment in that code conversion and CDS processing are performed in units of two bits.

Figure 21:
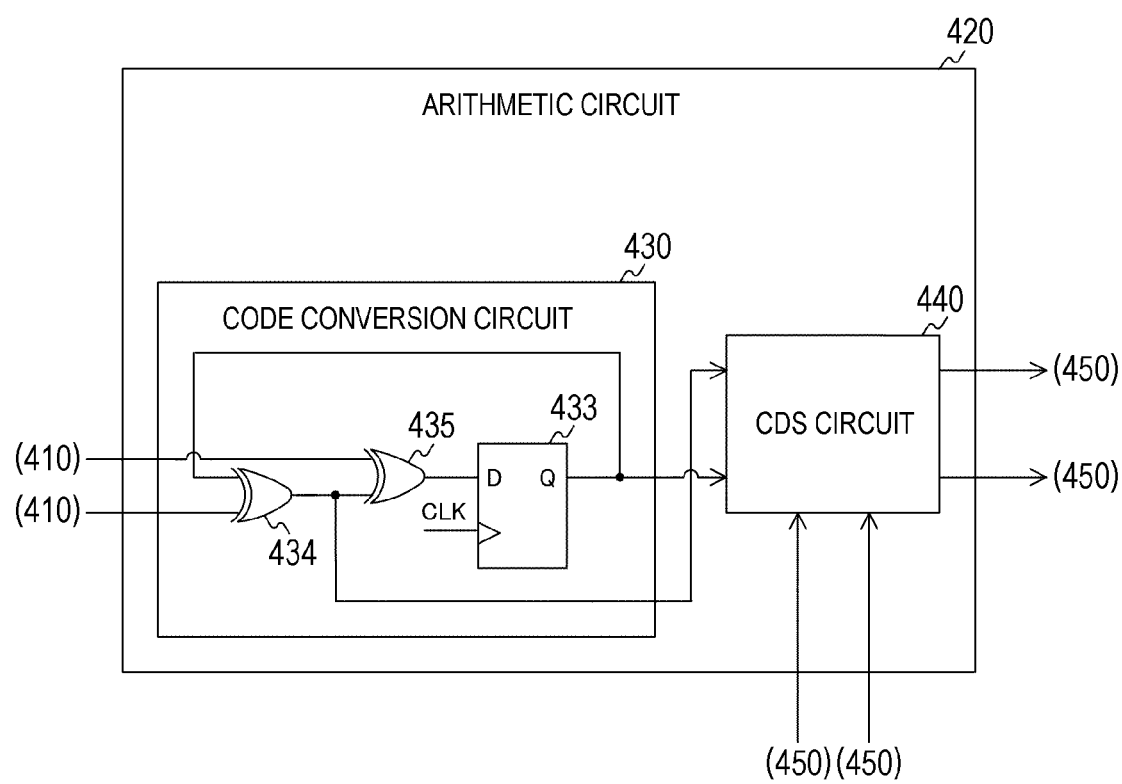
FIG. 21 is a circuit diagram illustrating a configuration example of an arithmetic circuit in a second embodiment of the present technology.

FIG. 21 is a circuit diagram illustrating a configuration example of the arithmetic circuit 420 in the second embodiment of the present technology. The arithmetic circuit 420 in the second embodiment differs from that in the first embodiment in that XOR gates 434 and 435 are arranged in place of an exclusive negative OR (XNOR) gate 431 in a code conversion circuit 430.

Data from a write latch unit 410 is input to the code conversion circuit 430 in units of two bits. The XOR gate 434 outputs an exclusive OR of one of the input two bits and an output bit of a flip-flop 433 to the XOR gate 435 and a CDS circuit 440. The XOR gate 435 outputs an exclusive OR of the other of the input two bits and an output bit of the XOR gate 434 to the flip-flop 433.

Figure 22:
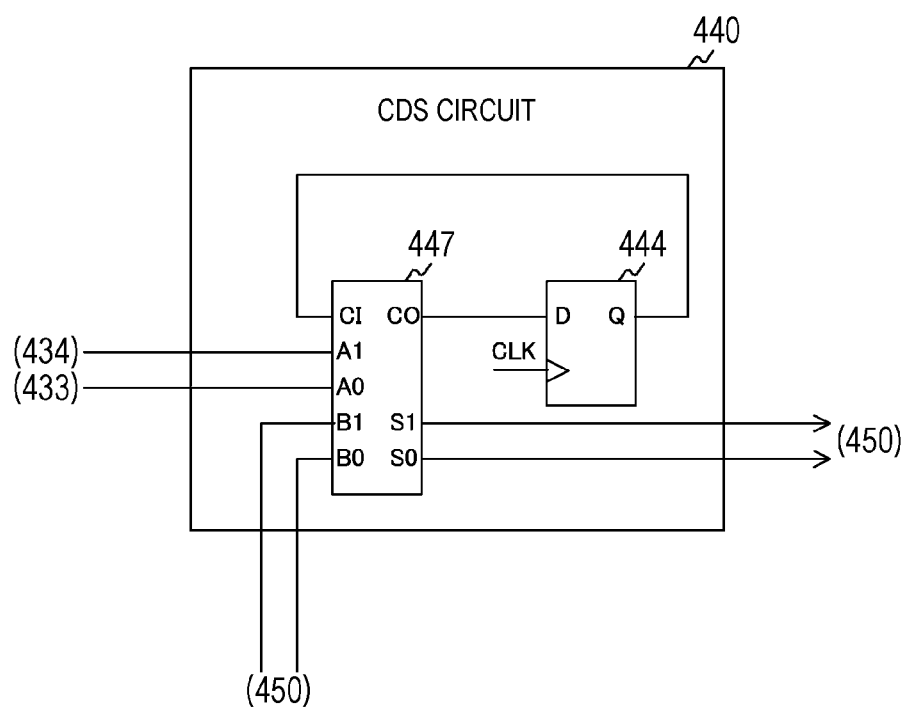
FIG. 22 is a circuit diagram illustrating a configuration example of a CDS circuit in the second embodiment of the present technology.

FIG. 22 is a circuit diagram illustrating a configuration example of the CDS circuit 440 in the second embodiment of the present technology. The CDS circuit 440 in the second embodiment is provided with a full adder 447 and a flip-flop 444.

The full adder 447 adds two bits input to input terminals A0 and A1 and two bits input to input terminals B0 and B1. The output bits of the XOR gate 434 and the flip-flop 433 are input to the input terminals A0 and A1. Data from a read latch unit 450 is input to the input terminals B0 and B1 in units of two bits. Furthermore, a carry output terminal C0 of the full adder 447 is connected to an input terminal D of the flip-flop 444, and a carry input terminal C1 of the full adder 447 is connected to an output terminal Q of the flip-flop 444. Output terminals S0 and S1 of the full adder 447 are connected to the read latch unit 450, and the data is output in units of two bits.

Note that a circuit configuration of the arithmetic circuit 420 is not limited to the configuration illustrated in FIGS. 21 and 22 as long as the arithmetic operation may be performed in units of two bits.

Figure 23:
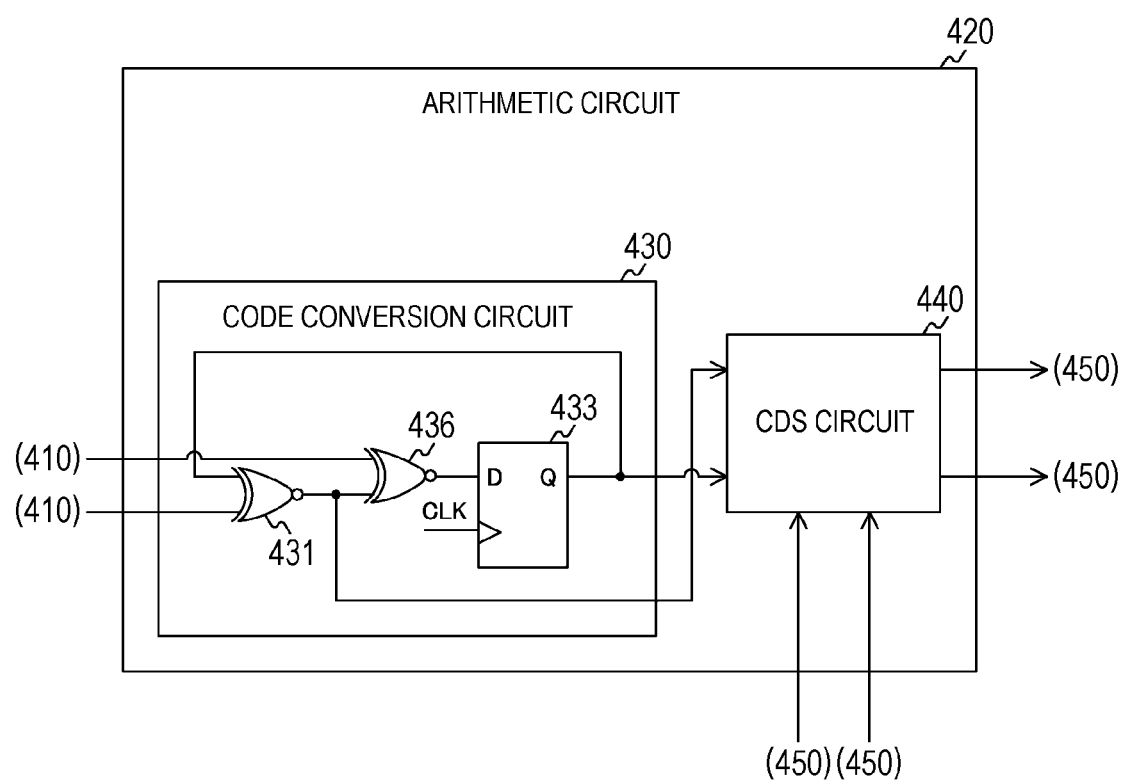
FIG. 23 is a circuit diagram illustrating a configuration example of an arithmetic circuit with a changed logic gate in the second embodiment of the present technology.
Figure 24:
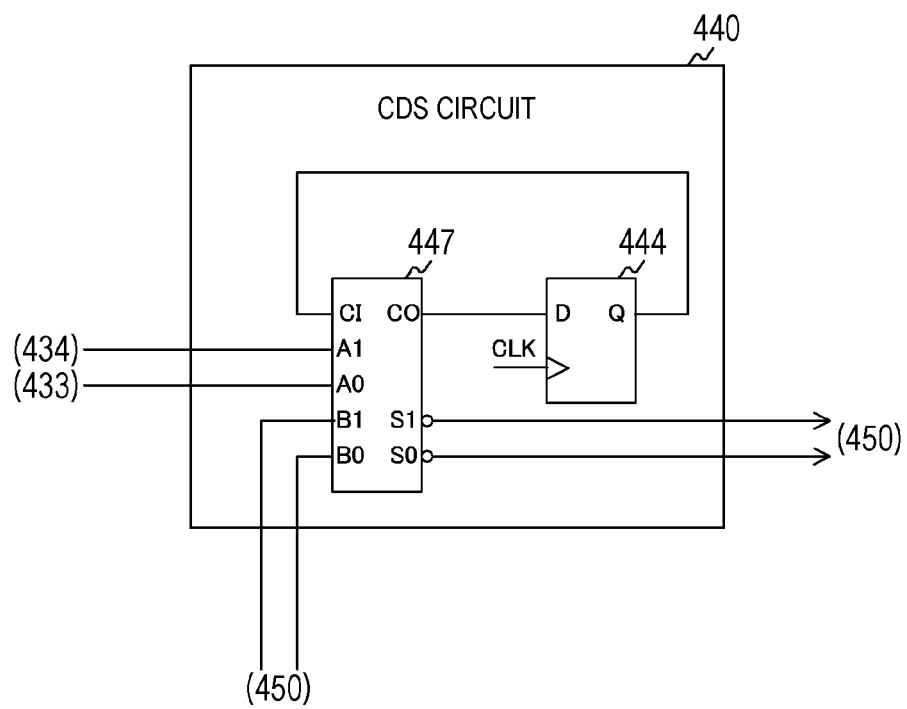
FIG. 24 is a circuit diagram illustrating a configuration example of a CDS circuit with a part changed in the second embodiment of the present technology.

For example, XNOR gates 431 and 436 may be arranged in place of the XOR gates 434 and 435 as illustrated in FIG. 23. In this case, as illustrated in FIG. 24, data obtained by inverting an addition result is output from the output terminals S0 and S1 of the full adder 447.

Figure 25:
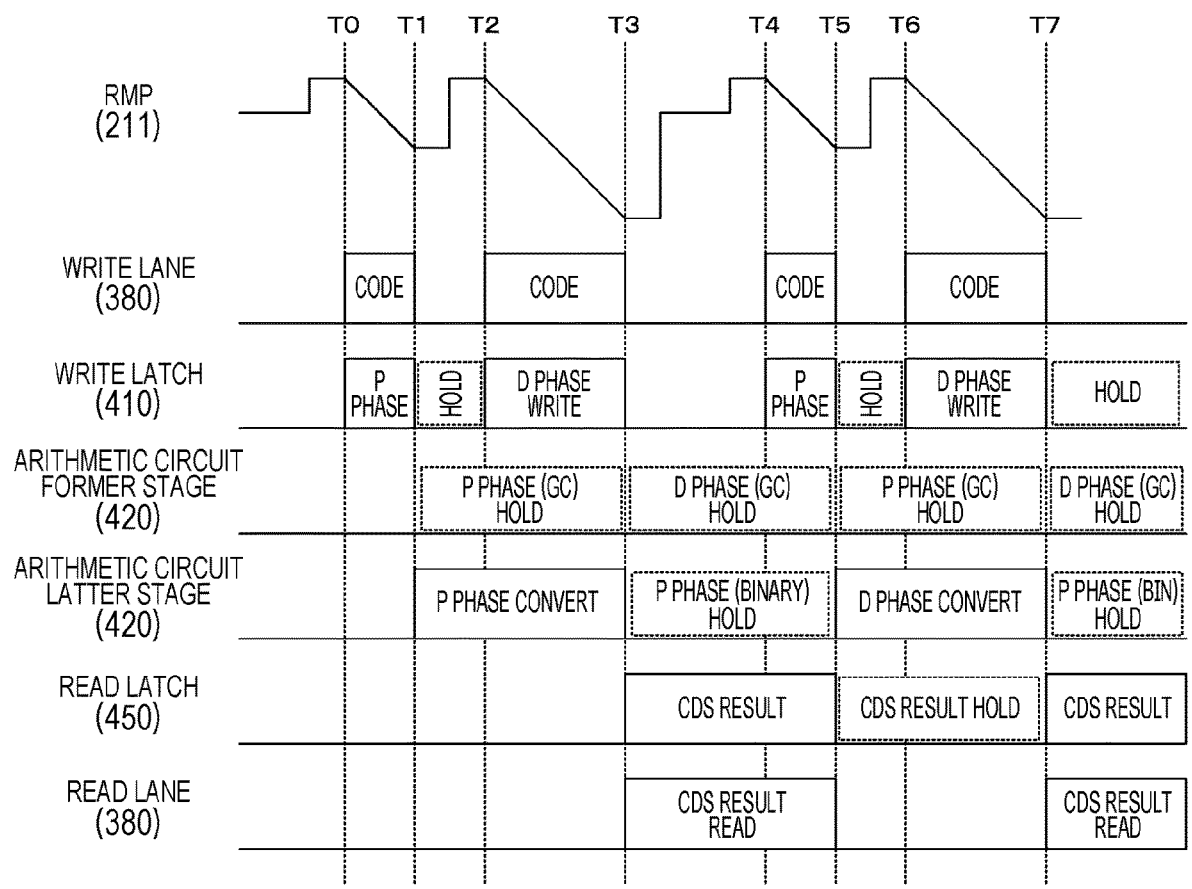
FIG. 25 is a timing chart illustrating an example of an operation of a cluster and a data transfer circuit in the second embodiment of the present technology.

FIG. 25 is a timing chart illustrating an example of an operation of a cluster 300 and a data transfer circuit 380 in the second embodiment of the present technology.

The reference signal RMP changes in a slope shape over a period from timing T0 to timing T1 immediately before the end of exposure. A write lane in the data transfer circuit 380 transfers a time code, and the transferred time code is written in the write latch unit 410 as reset data (P phase).

The write latch unit 410 holds the reset data (P phase) in a period from timing T1 to timing T2.

Then, the reference signal RMP changes in a slope shape over a period from timing T2 to timing T3 immediately after the end of exposure. The write lane transfers the time code, and the transferred time code is written in the write latch unit 410 as signal data (D phase).

In a period from timing T1 to timing T3, the arithmetic circuit 420 converts a code of the reset data and allows the read latch unit 450 to hold the data in a period from timing T3 to timing T5. Furthermore, the arithmetic circuit 420 performs CDS processing and writes a result thereof in the read latch unit 450.

After timing T4, the above-described processing is repeatedly executed. Furthermore, the read latch unit 450 holds pixel data being the result of the CDS processing from timing T5 to timing T7, and the read lane in the data transfer circuit 380 reads to transfer the result of the CDS processing (pixel data) from timing T3 to timing T5.

In this manner, according to the second embodiment of the present technology, since the arithmetic circuit 420 performs the CDS processing in units of two bits, the delay time required for the processing may be made shorter as compared with a case where the CDS processing is performed bit by bit.

3. THIRD EMBODIMENT

In the first embodiment described above, one arithmetic circuit 420 is arranged for each storage unit 400, but the larger the number of pixels corresponding to the storage unit 400, the longer the delay time required for an arithmetic operation might be. A storage unit 400 according to a third embodiment is different from that in the first embodiment in that a plurality of arithmetic circuits 420 is arranged.

Figure 26:
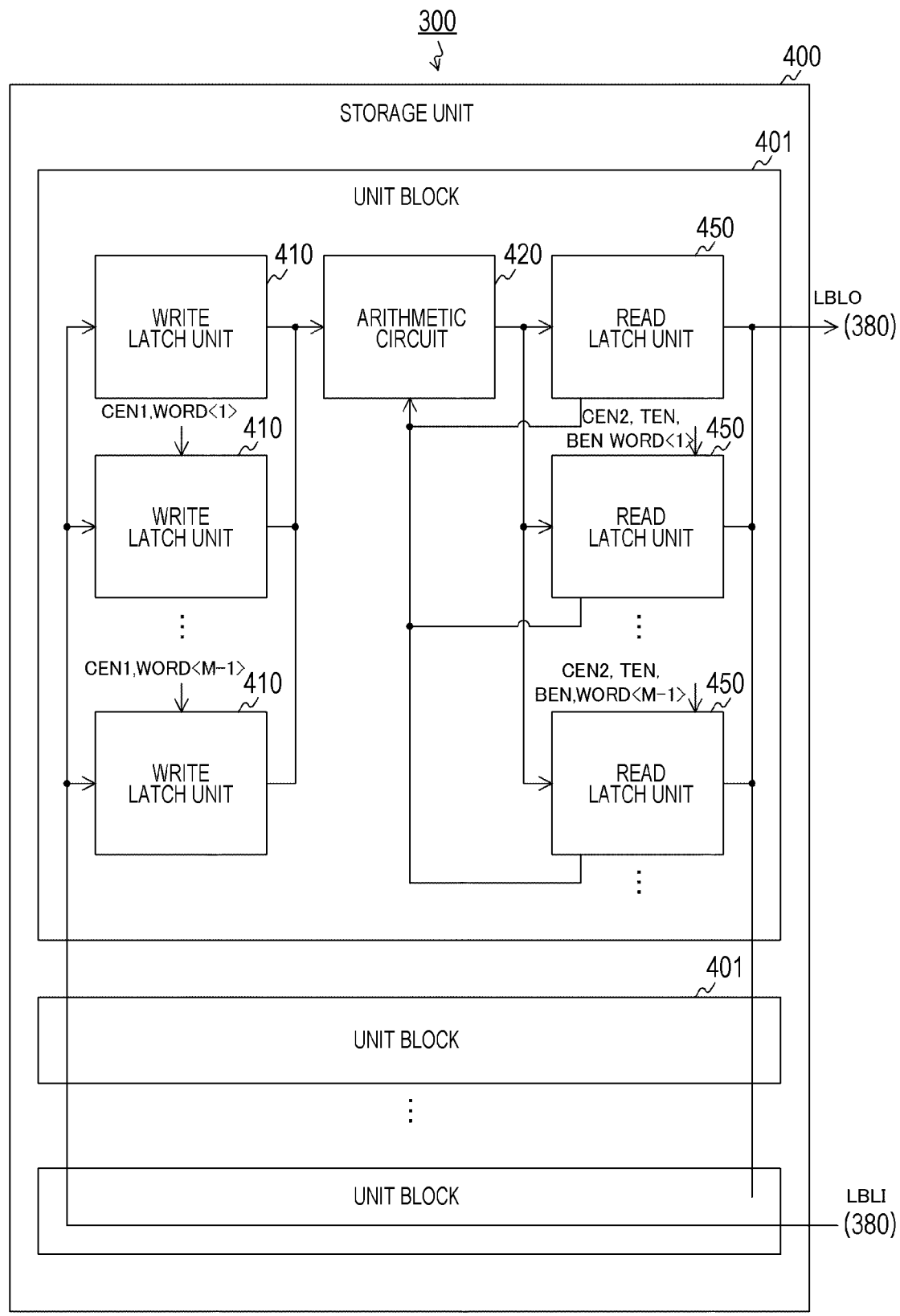
FIG. 26 is a block diagram illustrating a configuration example of a storage unit in a third embodiment of the present technology.

FIG. 26 is a block diagram illustrating a configuration example of the storage unit 400 in the third embodiment of the present technology. A plurality of unit blocks 401 is arranged in the storage unit 400 in the third embodiment. In each of the unit blocks 401, M write latch units 410, M read latch units 450, and the arithmetic circuit 420 are arranged as in the first embodiment. With the arithmetic circuits 420, data from a pixel group corresponding to the storage unit 400 may be processed in parallel.

In this manner, according to the third embodiment of the present technology, since a plurality of arithmetic circuits 420 that performs a differential arithmetic operation and the like is arranged in the storage unit 400 to perform the arithmetic operation in parallel, the delay time required for CDS processing and the like may be shortened as compared with a case of arranging one arithmetic circuit 420.

4. FOURTH EMBODIMENT

In the first embodiment described above, one former stage holding unit 419, one arithmetic circuit 420, and one latter stage holding unit 459 are arranged for each cluster 300, but the number of arithmetic circuits 420 increases according to the number of clusters 300, so that a circuit scale increases. A solid-state imaging element 200 in a fourth embodiment is different from that in the first embodiment in that a plurality of clusters 300 shares an arithmetic circuit 420.

Figure 27:
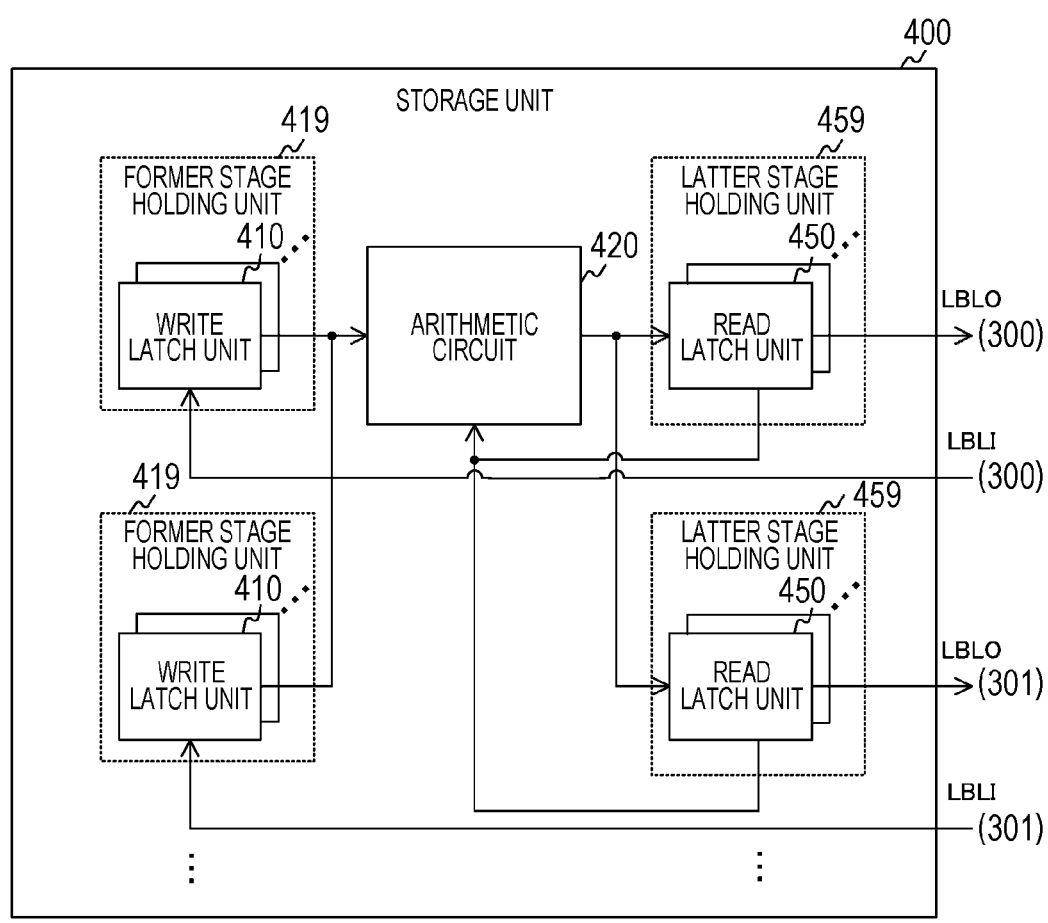
FIG. 27 is a block diagram illustrating a configuration example of a storage unit in a fourth embodiment of the present technology.

FIG. 27 is a block diagram illustrating a configuration example of a storage unit 400 in the fourth embodiment of the present technology. The storage unit 400 in the fourth embodiment is shared by a plurality of clusters such as clusters 300 and 301. Furthermore, one former stage holding unit 419 and one latter stage holding unit 459 are arranged for each cluster. Then, the clusters share one arithmetic circuit 420. For example, first former stage holding unit 419 and latter stage holding unit 459 are connected to the cluster 300, and second former stage holding unit 419 and latter stage holding unit 459 are connected to the cluster 301.

In this manner, according to the fourth embodiment of the present technology, since a plurality of clusters shares one arithmetic circuit 420, a circuit scale may be reduced as compared with a case where the arithmetic circuit 420 is arranged for each cluster.

5. FIFTH EMBODIMENT

In the first embodiment described above, the data transfer circuit 380 transfers the pixel data after the CDS processing for each pixel, but the number of times of transfer increases as the number of pixels increases. A solid-state imaging element 200 in a fifth embodiment is different from that in the first embodiment in that pixel addition is performed.

Figure 28:
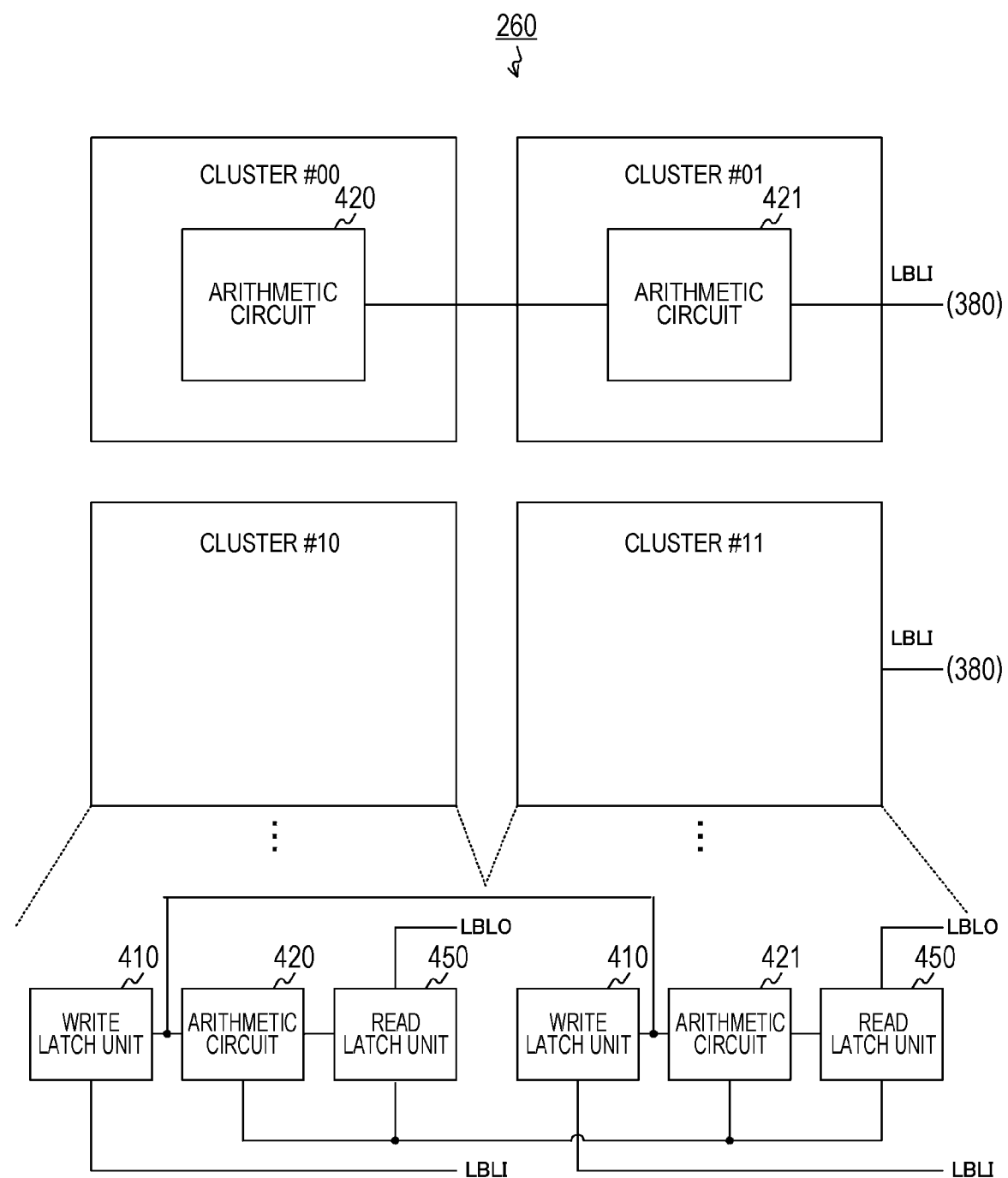
FIG. 28 is a view illustrating a configuration example of a pixel AD conversion unit in a fifth embodiment of the present technology.

FIG. 28 is a view illustrating a configuration example of a pixel AD conversion unit 260 in the fifth embodiment of the present technology. In the drawing, a write latch unit 410 and a read latch unit 450 in a cluster 300 in a first row are not illustrated. In the pixel AD conversion unit 260 in the fifth embodiment, a plurality of clusters 300 arranged in a horizontal direction is connected to each other. For example, a data transfer circuit 380 is arranged in every four columns of the clusters 300. Then, a first column and a second column out of the four columns are connected to each other, and the data transfer circuit 380 is arranged between the second column and a third column. Furthermore, the third column and a fourth column are connected to each other. For example, an output node of the read latch unit 450 in the first column is connected to a local bit line LBLI, and output nodes of the write latch units 410 and output nodes of the read latch units 450 (feedback nodes to the arithmetic circuit 420) are connected to each other. Note that the number of clusters 300 connected in the horizontal direction is not limited to two. Furthermore, although a plurality of clusters 300 arranged in the horizontal direction is connected, the configuration is not limited to this, and it may also be configured that a plurality of clusters 300 arranged in a vertical direction is connected.

Then, an arithmetic circuit 421 is arranged in each of the clusters 300 in the second and third columns connected to the data transfer circuit 380. The arithmetic circuit 421 performs CDS processing on data in the second or third column. The arithmetic circuit 420 in each of the first and fourth columns supplies pixel data after the CDS processing to the corresponding arithmetic circuit 421. The arithmetic circuit 421 in the second column performs pixel addition of the pixel data in the first column and the pixel data in the second column, and outputs the same to the data transfer circuit 380. In the pixel addition, for example, addition averaging is performed. Furthermore, the arithmetic circuit 421 in the third column performs pixel addition of the pixel data in the third column and the pixel data in the fourth column, and outputs the same to the data transfer circuit 380. Therefore, the number of data to be transferred is thinned out to half.

In this manner, according to the fifth embodiment of the present technology, since the pixel data of each of a plurality of clusters 300 is added, the number of data to be transferred may be reduced.

6. SIXTH EMBODIMENT

In the fifth embodiment described above, the pixel addition is performed by the addition averaging, but in Bayer arrangement or the like, it is desirable to add in consideration of color centroid. An arithmetic circuit 420 in a sixth embodiment is different from that in the first embodiment in that weighting addition is performed in consideration of the color centroid.

Figure 29:
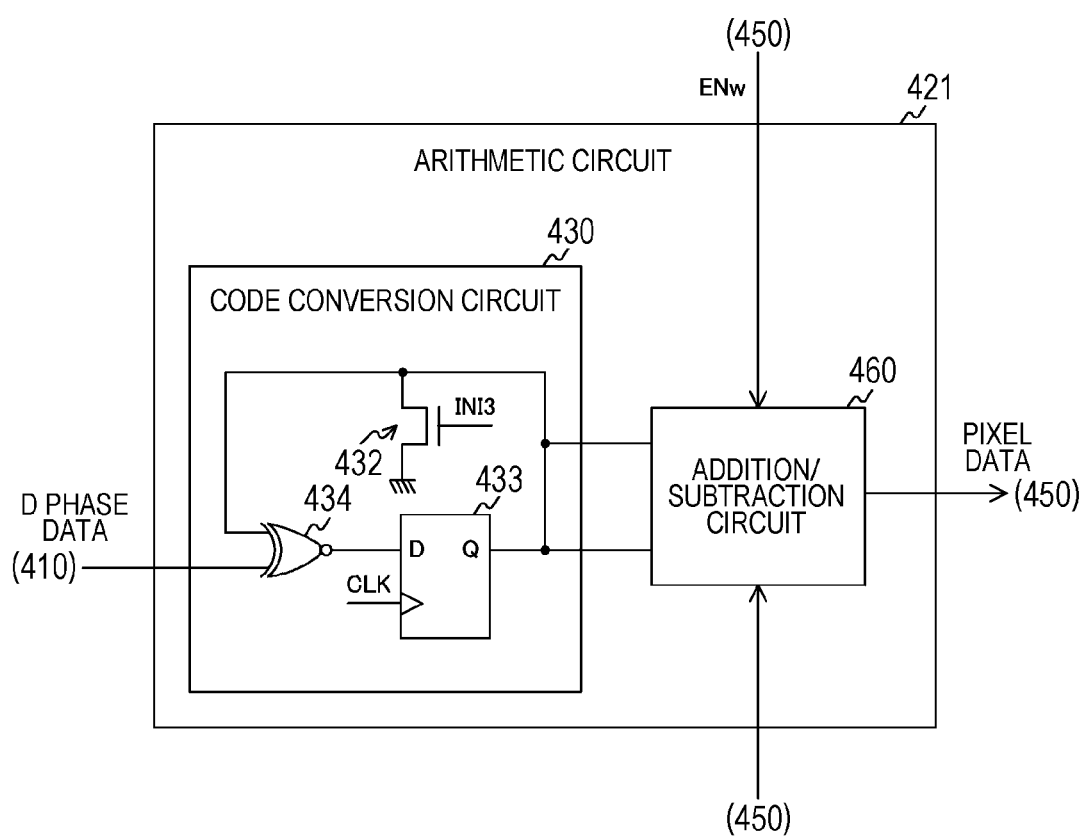
FIG. 29 is a circuit diagram illustrating a configuration example of an arithmetic circuit in a sixth embodiment of the present technology.

FIG. 29 is a circuit diagram illustrating a configuration example of an arithmetic circuit 421 in the sixth embodiment of the present technology. The arithmetic circuit 421 in the sixth embodiment is different from that in the first embodiment in that an addition/subtraction circuit 460 is provided in place of a CDS circuit 440.

Figure 30:
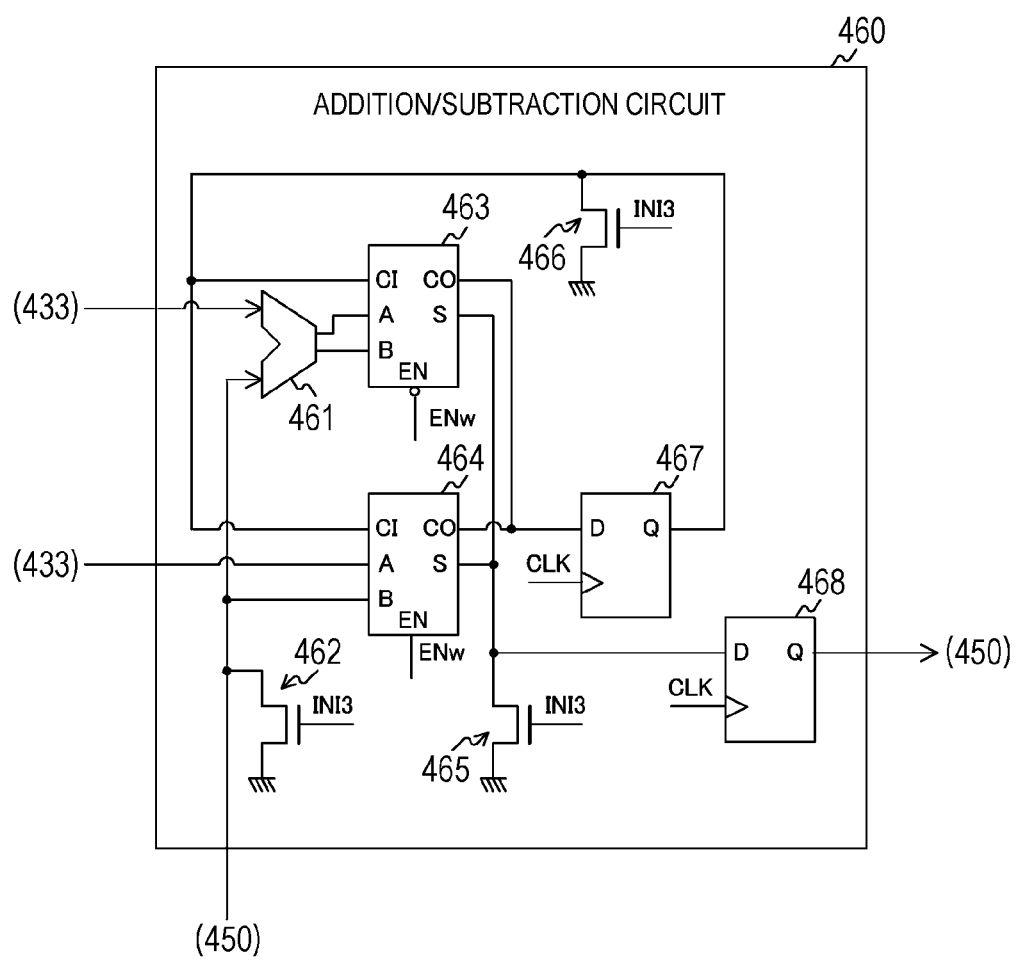
FIG. 30 is a circuit diagram illustrating a configuration example of an addition/subtraction circuit in the sixth embodiment of the present technology.

FIG. 30 is a circuit diagram illustrating a configuration example of the addition/subtraction circuit 460 in the sixth embodiment of the present technology. The addition/subtraction circuit 460 is provided with an arithmetic logic unit (ALU) 461, n-type transistors 462, 465, and 466, full adders 463 and 464, and flip-flops 467 and 468. For example, an MOS transistor is used as a transistor in the addition/subtraction circuit 460.

The ALU 461 performs a predetermined arithmetic operation on an output bit of a flip-flop 433 and a bit from the read latch unit 450. The ALU 461 supplies a two-bit arithmetic result to input terminals A and B of the full adder 463.

The full adder 463 adds the input two bits. The full adder 463 outputs an addition result from an output terminal S to the flip-flop 468, and outputs a carry from a carry output terminal C0 to the flip-flop 467. Furthermore, the full adder 463 performs addition according to an inverted signal of an enable signal ENw from a drive circuit 230.

The full adder 464 adds the input two bits. The output bit of the flip-flop 433 is input to the input terminal A of the full adder 463, and the bit from the read latch unit 450 is input to the input terminal B. Furthermore, the full adder 464 outputs an addition result from an output terminal S to the flip-flop 468, and outputs a carry from a carry output terminal C0 to the flip-flop 467. Furthermore, the full adder 464 performs addition according to the enable signal ENw.

The flip-flop 467 holds a carry bit. The flip-flop 467 inputs the held bit to a carry input terminal CI of each of the full adders 463 and 464.

The flip-flop 468 holds an output bit of either the full adder 463 or 464. The flip-flop 468 outputs the held bit to the read latch unit 450.

The n-type transistor 462 is inserted between input terminals of the ALU 461 and the full adder 464 and a terminal of a reference potential. Furthermore, a drive signal GCINI from the drive circuit 230 is input to a gate of the n-type transistor 462. The drive signal GCINI is a signal for initializing the arithmetic circuit 420.

The n-type transistor 466 is inserted between an output terminal Q of the flip-flop 467 and a terminal of a reference potential. Furthermore, a drive signal INI3 is input to a gate of the n-type transistor 465.

The n-type transistor 465 is inserted between the output terminals S of the full adders 463 and 464 and a terminal of a reference potential. Furthermore, the drive signal INI3 is input to a gate of the n-type transistor 466.

With the above-described configuration, the drive circuit 230 drives the full adder 464 by the enable signal ENw to execute CDS processing (in other words, subtraction processing). Then, the drive circuit 230 drives the full adder 464 by the enable signal ENw to perform the weighting addition of two pixel data of the same color on the basis of the color centroid.

In this manner, according to the sixth embodiment of the present technology, since the addition/subtraction circuit 460 performs the weighting addition on the basis of the color centroid, it is possible to improve an image quality of image data as compared with a case where the addition averaging is performed regardless of the color centroid.

7. APPLICATION EXAMPLE TO MOBILE BODY

The technology according to the present disclosure (present technology) is applicable to various products. For example, the technology according to the present disclosure may also be realized as a device mounted on any type of mobile body such as an automobile, an electric automobile, a hybrid electric automobile, a motorcycle, a bicycle, a personal mobility, an airplane, a drone, a ship, and a robot.

Figure 31:
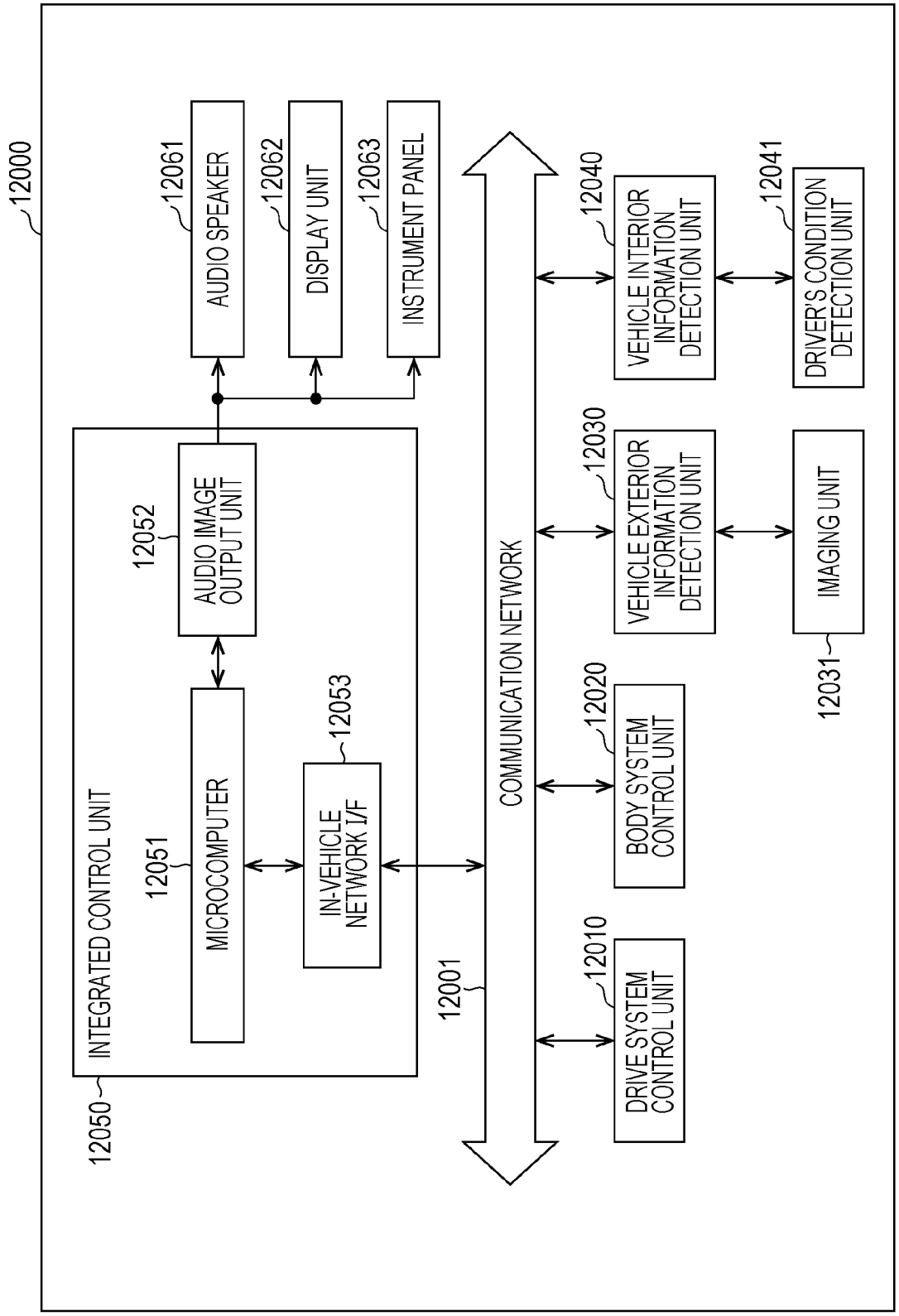
FIG. 31 is a block diagram illustrating a schematic configuration example of a vehicle control system.

FIG. 31 is a block diagram illustrating a schematic configuration example of a vehicle control system being an example of a mobile body control system to which the technology according to the present disclosure is applicable.

A vehicle control system 12000 is provided with a plurality of electronic control units connected to one another via a communication network 12001. In the example illustrated in FIG. 31, the vehicle control system 12000 is provided with a drive system control unit 12010, a body system control unit 12020, a vehicle exterior information detection unit 12030, a vehicle interior information detection unit 12040, and an integrated control unit 12050. Furthermore, a microcomputer 12051, an audio image output unit 12052, and an in-vehicle network interface (I/F) 12053 are illustrated as functional configurations of the integrated control unit 12050.

The drive system control unit 12010 controls operation of devices related to a drive system of a vehicle according to various programs. For example, the drive system control unit 12010 serves as a control device of a driving force generating device for generating driving force of the vehicle such as an internal combustion engine or a driving motor, a driving force transmitting mechanism for transmitting the driving force to wheels, a steering mechanism for adjusting a rudder angle of the vehicle, a braking device for generating braking force of the vehicle and the like.

The body system control unit 12020 controls operation of various devices mounted on a vehicle body according to the various programs. For example, the body system control unit 12020 serves as a control device of a keyless entry system, a smart key system, a power window device, or various lights such as a head light, a backing light, a brake light, a blinker, or a fog light. In this case, a radio wave transmitted from a portable device that substitutes for a key or signals of various switches may be input to the body system control unit 12020. The body system control unit 12020 receives an input of the radio wave or signals and controls a door lock device, a power window device, the lights and the like of the vehicle.

The vehicle exterior information detection unit 12030 detects information outside the vehicle equipped with the vehicle control system 12000. For example, an imaging unit 12031 is connected to the vehicle exterior information detection unit 12030. The vehicle exterior information detection unit 12030 allows the imaging unit 12031 to take an image of the exterior of the vehicle and receives taken image data. The vehicle exterior information detection unit 12030 may perform detection processing of objects such as a person, a vehicle, an obstacle, a sign, or a character on a road surface or distance detection processing on the basis of the received image.

The imaging unit 12031 is an optical sensor that receives light and outputs an electric signal according to an amount of the received light. The imaging unit 12031 may output the electric signal as the image or output the same as ranging information. Furthermore, the light received by the imaging unit 12031 may be visible light or invisible light such as infrared light.

The vehicle interior information detection unit 12040 detects information in the vehicle. The vehicle interior information detection unit 12040 is connected to, for example, a driver's condition detection unit 12041 for detecting a driver's condition. The driver's condition detection unit 12041 includes, for example, a camera that images the driver, and the vehicle interior information detection unit 12040 may calculate a driver's fatigue level or concentration level or may determine whether or not the driver is dozing on the basis of detection information input from the driver's condition detection unit 12041.

The microcomputer 12051 may perform an arithmetic operation of a control target value of the driving force generating device, the steering mechanism, or the braking device on the basis of the information inside and outside the vehicle obtained by the vehicle exterior information detection unit 12030 or the vehicle interior information detection unit 12040, and output a control instruction to the drive system control unit 12010. For example, the microcomputer 12051 may perform cooperative control for realizing functions of advanced driver assistance system (ADAS) including collision avoidance or impact attenuation of the vehicle, following travel based on the distance between the vehicles, vehicle speed maintaining travel, vehicle collision warning, vehicle lane departure warning and the like.

Furthermore, the microcomputer 12051 may perform the cooperative control for realizing automatic driving and the like to autonomously travel independent from the operation of the driver by controlling the driving force generating device, the steering mechanism, the braking device or the like on the basis of the information around the vehicle obtained by the vehicle exterior information detection unit 12030 or the vehicle interior information detection unit 12040.

Furthermore, the microcomputer 12051 may output the control instruction to the body system control unit 12020 on the basis of the information outside the vehicle obtained by the vehicle exterior information detection unit 12030. For example, the microcomputer 12051 may perform the cooperative control to realize glare protection such as controlling the head light according to a position of a preceding vehicle or an oncoming vehicle detected by the vehicle exterior information detection unit 12030 to switch a high beam to a low beam.

The audio image output unit 12052 transmits at least one of audio or image output signal to an output device capable of visually or audibly notifying an occupant of the vehicle or the outside the vehicle of the information. In the example in FIG. 31, as the output device, an audio speaker 12061, a display unit 12062, and an instrument panel 12063 are illustrated. The display unit 12062 may include at least one of an on-board display or a head-up display, for example.

Figure 32:
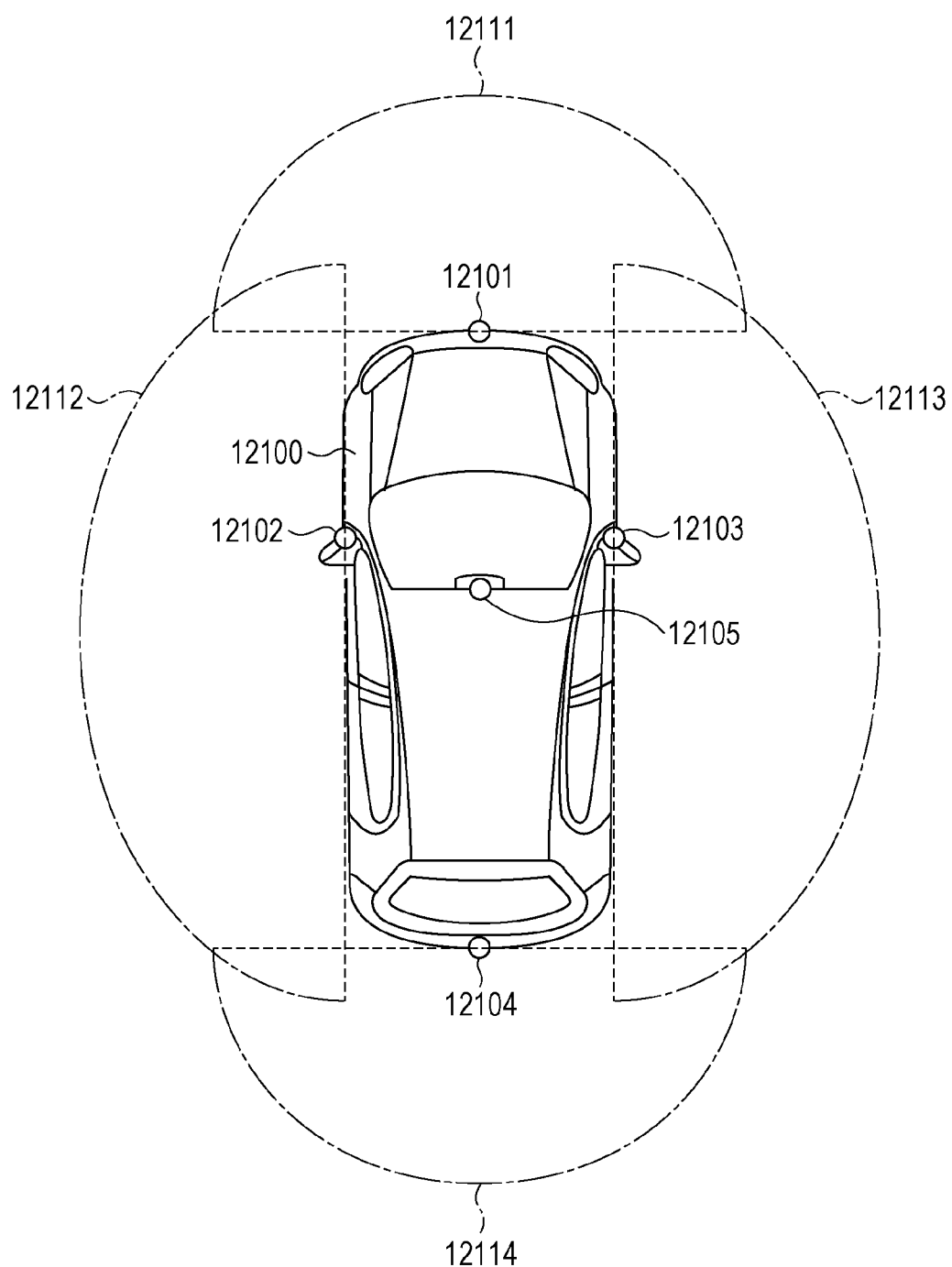
FIG. 32 is an illustrative view illustrating an example of an installation position of an imaging unit.

FIG. 32 is a view illustrating an example of an installation position of the imaging unit 12031.

In FIG. 32, imaging units 12101, 12102, 12103, 12104, and 12105 are included as the imaging unit 12031.

The imaging units 12101, 12102, 12103, 12104, and 12105 are provided in positions such as, for example, a front nose, a side mirror, a rear bumper, a rear door, and an upper portion of a front windshield in a vehicle interior of the vehicle 12100. The imaging unit 12101 provided on the front nose and the imaging unit 12105 provided in the upper portion of the front windshield in the vehicle interior principally obtain images in front of the vehicle 12100. The imaging units 12102 and 12103 provided on the side mirrors principally obtain images of the sides of the vehicle 12100. The imaging unit 12104 provided on the rear bumper or the rear door principally obtains an image behind the vehicle 12100. The imaging unit 12105 provided on the upper portion of the front windshield in the vehicle interior is mainly used for detecting the preceding vehicle, a pedestrian, an obstacle, a traffic signal, a traffic sign, a lane or the like.

Note that, in FIG. 32, an example of imaging ranges of the imaging units 12101 to 12104 is illustrated. An imaging range 12111 indicates the imaging range of the imaging unit 12101 provided on the front nose, imaging ranges 12112 and 12113 indicate the imaging ranges of the imaging units 12102 and 12103 provided on the side mirrors, and an imaging range 12114 indicates the imaging range of the imaging unit 12104 provided on the rear bumper or the rear door. For example, image data taken by the imaging units 12101 to 12104 are superimposed, so that an overlooking image of the vehicle 12100 as seen from above is obtained.

At least one of the imaging units 12101 to 12104 may have a function of obtaining distance information. For example, at least one of the imaging units 12101 to 12104 may be a stereo camera including a plurality of imaging elements, or may be an imaging element including pixels for phase difference detection.

For example, the microcomputer 12051 may extract especially a closest solid object on a traveling path of the vehicle 12100, the solid object traveling at a predetermined speed (for example, 0 km/h or higher) in a direction substantially the same as that of the vehicle 12100 as the preceding vehicle by obtaining a distance to each solid object in the imaging ranges 12111 to 12114 and a change in time of the distance (relative speed relative to the vehicle 12100) on the basis of the distance information obtained from the imaging units 12101 to 12104. Moreover, the microcomputer 12051 may set the distance between the vehicles to be secured in advance from the preceding vehicle, and may perform automatic brake control (including following stop control), automatic acceleration control (including following start control) and the like. In this manner, it is possible to perform the cooperative control for realizing the automatic driving and the like to autonomously travel independent from the operation of the driver.

For example, the microcomputer 12051 may extract solid object data regarding the solid object while sorting the same into a motorcycle, a standard vehicle, a large-sized vehicle, a pedestrian, and other solid objects such as a utility pole on the basis of the distance information obtained from the imaging units 12101 to 12104 and use for automatically avoiding obstacles. For example, the microcomputer 12051 discriminates the obstacles around the vehicle 12100 into an obstacle visible to a driver of the vehicle 12100 and an obstacle difficult to see. Then, the microcomputer 12051 determines a collision risk indicating a degree of risk of collision with each obstacle, and when the collision risk is equal to or higher than a set value and there is a possibility of collision, this may perform driving assistance for avoiding the collision by outputting an alarm to the driver via the audio speaker 12061 and the display unit 12062 or performing forced deceleration or avoidance steering via the drive system control unit 12010.

At least one of the imaging units 12101 to 12104 may be an infrared camera for detecting infrared light. For example, the microcomputer 12051 may recognize a pedestrian by determining whether or not there is a pedestrian in the images taken by the imaging units 12101 to 12104. Such pedestrian recognition is carried out, for example, by a procedure of extracting feature points in the images taken by the imaging units 12101 to 12104 as the infrared cameras and a procedure of performing pattern matching processing on a series of feature points indicating an outline of an object to discriminate whether or not this is a pedestrian. When the microcomputer 12051 determines that there is a pedestrian in the images taken by the imaging units 12101 to 12104 and recognizes the pedestrian, the audio image output unit 12052 controls the display unit 12062 to superimpose a rectangular contour for emphasis on the recognized pedestrian to display. Furthermore, the audio image output unit 12052 may control the display unit 12062 to display an icon and the like indicating the pedestrian in a desired position.

An example of the vehicle control system to which the technology according to the present disclosure may be applied is described above. The technology according to the present disclosure may be applied to the imaging unit 12031, for example, out of the configurations described above. Specifically, the imaging device 100 in FIG. 1 may be applied to the imaging unit 12031. By applying the technology according to the present disclosure to the imaging unit 12031, it is possible to reduce the number of times of transfer of the data.

Note that the above-described embodiment describes an example of embodying the present technology, and there is a correspondence relationship between items in the embodiment and the matters specifying the invention in claims. Similarly, there is a correspondence relationship between the matters specifying the invention in claims and the matters in the embodiment of the present technology having the same names. However, the present technology is not limited to the embodiment and may be embodied by variously modifying the embodiment without departing from the scope thereof.

Furthermore, the procedure described in the above-described embodiment may be considered as a method including a series of procedures and may be considered as a program for allowing a computer to execute the series of procedures and a recording medium which stores the program. A compact disc (CD), a MiniDisc (MD), a digital versatile disc (DVD), a memory card, a Blu-ray (trademark) disc and the like may be used, for example, as the recording medium.

Note that the effect described in this specification is illustrative only and is not limitative; there may also be another effect.

Note that, the present technology may also have a following configuration.

(1) A solid-state imaging element provided with:
a plurality of storage units each provided with a holding unit that holds predetermined reset data and signal data according to an amount of light, and an arithmetic circuit that obtains a difference between the reset data and the signal data and outputs the difference as pixel data; and
a data transfer circuit that transfers the output pixel data.

(2) The solid-state imaging element according to (1) described above, in which
the holding unit is provided with a predetermined number of holding circuits, and
the arithmetic circuit is commonly connected to the predetermined number of holding circuits.

(3) The solid-state imaging element according to (2) described above, in which
the holding unit outputs the reset data and the signal data to the arithmetic circuit in order bit by bit, and
the arithmetic circuit obtains a difference between the output bit of the reset data and the output bit of the signal data.

(4) The solid-state imaging element according to (2) described above, in which
the holding unit outputs the reset data and the signal data to the arithmetic circuit in order in units of two bits, and
the arithmetic circuit obtains a difference between the output two bits of the reset data and the output two bits of the signal data.

(5) The solid-state imaging element according to any one of (2) to (4) described above, in which
the plurality of storage units is arranged in a two-dimensional lattice manner,
the arithmetic circuit adds the pixel data of each of a predetermined number of storage units arranged in a predetermined horizontal direction out of the plurality of storage units, and
the data transfer circuit transfers the added pixel data in a direction perpendicular to the horizontal direction.

(6) The solid-state imaging element according to any one of (2) to (5), in which the arithmetic circuit performs weighting addition of a predetermined number of the pixel data.

(7) The solid-state imaging element according to (1) described above, in which a plurality of unit blocks is arranged in each of the plurality of storage units, and a predetermined number of holding units commonly connected to the arithmetic circuit and the arithmetic circuit are arranged in each of the plurality of unit blocks.

(8) The solid-state imaging element according to (1) described above, in which a predetermined number of holding units commonly connected to the arithmetic circuit are arranged in a storage unit.

(9) The solid-state imaging element according to any one of (1) to (8) described above, in which the arithmetic circuit is further provided with a code conversion circuit that converts a code format of each of the reset data and the signal data, and a correlated double sampling circuit that obtains a difference between the reset data the code format of which is converted and the signal data the code format of which is converted as the pixel data.

(10) The solid-state imaging element according to any one of (1) to (9) described above, in which the holding unit is provided with a former stage holding unit that holds the reset data and the signal data in order and outputs the reset data and the signal data to the arithmetic circuit, and a latter stage holding unit that holds the reset data and outputs the reset data to the arithmetic circuit, and holds the pixel data and outputs the pixel data to the data transfer circuit.

(11) A solid-state imaging element provided with:

a pixel array unit that includes a plurality of pixels;

a plurality of storage units each provided with a holding unit that holds predetermined reset data and signal data according to an amount of light, and an arithmetic circuit that obtains a difference between the reset data and the signal data and outputs the difference as pixel data; and a transfer circuit that transfers the output pixel data, in which the arithmetic circuit is arranged immediately below the pixel array unit.

(12) An imaging device provided with:

a plurality of storage units each provided with a holding unit that holds predetermined reset data and signal data according to an amount of light, and an arithmetic circuit that obtains a difference between the reset data and the signal data and outputs the difference as pixel data;

a data transfer circuit that transfers the output pixel data; and a pixel data processing circuit that processes the transferred pixel data.

(13) A control method of a solid-state imaging element, the method provided with:

a holding step of a holding unit of holding predetermined reset data and signal data according to an amount of light;

an arithmetic step of an arithmetic circuit of obtaining a difference between the reset data and the signal data and outputting the difference as pixel data; and a data transfer step of a transfer circuit of transferring the output pixel data.

REFERENCE SIGNS LIST

100 Imaging device
110 Optical unit
120 DSP circuit
130 Display unit
140 Operation unit
150 Bus
160 Frame memory
170 Storage unit
180 Power supply unit
200 Solid-state imaging element
201 Light reception chip
202 Circuit chip
210 Pixel array unit
211 DAC
212, 230 Drive circuit
213 Pixel block
220 Pixel
221 Pixel circuit
222 Discharge transistor
223 Photodiode
224 Transfer transistor
225 Floating diffusion layer
226 Reset transistor
227, 228 Differential transistor
229 Current source transistor
240 Timing generation circuit
250 Time code generation unit
260 Pixel AD conversion unit
270 Pixel data processing circuit
300 Cluster
310 AD conversion circuit
320 Comparator
321, 322, 331, 341, 342, 355, 356, 361, 363, 366, 367, 371, 373 P-type transistor
330 Voltage conversion circuit
332, 333, 354, 357, 362, 364, 365, 368, 372, 374, 387, 432, 442, 443, 446, 462, 465, 466 N-type transistor
340 Control circuit
350 NOR gate
360 Delay VCO circuit
370 Buffer circuit
380 Data transfer circuit
381 Unit block
382, 433, 444, 445, 467, 468 Flip-flop
383, 385, 412 to 415, 453 to 456 Inverter
384, 386 Buffer
400 Storage unit
401 Unit block
410 Write latch unit
411 Write latch circuit
419 Former stage holding unit
420, 421 Arithmetic circuit
430 Code conversion circuit
431, 436 Exclusive Negative OR (XNOR) Gate
434, 435 Exclusive OR (XOR) gate
440 CDS circuit
441, 447, 463, 464 Full adder
450 Read latch unit
451 Read latch circuit
452 Switch
459 Latter stage holding unit
460 Addition/subtraction circuit
461 ALU
12031 Imaging unit

The invention claimed is:

1. A solid-state imaging element, comprising:
a plurality of storage circuits, wherein each storage circuit of the plurality of storage circuits includes:
a first plurality of holding circuits, wherein
each storage circuit corresponds to at least one pixel of a plurality of pixels,
each holding circuit of the first plurality of holding circuits is configured to hold reset data and signal data, and
the signal data is based on an amount of light received by a pixel of the plurality of pixels; and
an arithmetic circuit commonly connected to the first plurality of holding circuits, wherein the arithmetic circuit is configured to:
obtain a difference between the reset data and the signal data; and
output the difference as pixel data; and
a data transfer circuit configured to transfer the output pixel data.

2. The solid-state imaging element according to claim 1, wherein
each holding circuit of the first plurality of holding circuits is further configured to output the reset data and the signal data to the arithmetic circuit in order bit by bit, and
the arithmetic circuit is further configured to obtain, based on the output of the reset data and the signal data bit by bit, a difference between an output bit of the reset data and an output bit of the signal data.

3. The solid-state imaging element according to claim 1, wherein
each holding circuit of the first plurality of holding circuits is further configured to output the reset data and the signal data to the arithmetic circuit in order in units of two bits, and
the arithmetic circuit is further configured to obtain a difference between the output two bits of the reset data and the output two bits of the signal data.

4. The solid-state imaging element according to claim 1, wherein
the plurality of storage circuits is in a two-dimensional lattice arrangement,
the arithmetic circuit is further configured to add the pixel data of each of a specific number of storage circuits of the plurality of storage circuits, and
the specific number of storage circuits is in a horizontal direction of the solid-state imaging element, and
the data transfer circuit is further configured to transfer the added pixel data in a direction perpendicular to the horizontal direction.

5. The solid-state imaging element according to claim 1, wherein the arithmetic circuit is further configured to perform weighting addition of the pixel data.

6. The solid-state imaging element according to claim 1, wherein
each storage circuit of the plurality of storage circuits further includes a plurality of unit blocks, and
each unit block of the plurality of unit blocks includes the arithmetic circuit.

7. The solid-state imaging element according to claim 1, wherein
each storage circuit of the plurality of storage circuits further includes a second plurality of holding circuits, and the first plurality of holding circuits and the second plurality of holding circuits are commonly connected to the arithmetic circuit.

8. The solid-state imaging element according to claim 1, wherein the arithmetic circuit includes:
a code conversion circuit configured to convert a code format of each of the reset data and the signal data, and
a correlated double sampling circuit configured to obtain, based on the conversion of the code format of each of the reset data and the signal data, the difference between the reset data and the signal data as the pixel data.

9. The solid-state imaging element according to claim 1, wherein
each storage circuit of the plurality of storage circuits further includes a second plurality of holding circuits,
the first plurality of holding circuits is further configured to:
hold the reset data and the signal data in order; and
output the reset data and the signal data to the arithmetic circuit, and
the second plurality of holding circuits is configured to:
hold the reset data,
output the reset data to the arithmetic circuit,
hold the pixel data; and
output the pixel data to the data transfer circuit.

10. The solid-state imaging element according to claim 1, wherein
each pixel of the plurality of pixels generates a reset level and a signal level, and
the first plurality of holding circuits includes a holding circuit configured to hold a first time code corresponding to the reset level as the reset data, and a second time code corresponding to the signal level as the signal data.

11. A solid-state imaging element, comprising:
a pixel array that includes a plurality of pixels, wherein each pixel of the plurality of pixels is configured to receive an amount of light;
a plurality of storage circuits, wherein each storage circuit of the plurality of storage circuits includes:
a plurality of holding circuits, wherein
each holding circuit of the plurality of holding circuits is configured to hold reset data and signal data, and
the signal data is based on the received amount of light; and
an arithmetic circuit commonly connected to the plurality of holding circuits, wherein the arithmetic circuit is configured to:
obtain a difference between the reset data and the signal data; and
output the difference as pixel data; and
a transfer circuit configured to transfer the output pixel data, wherein the arithmetic circuit is below the pixel array.

12. An imaging device, comprising:
a plurality of storage circuits, wherein each storage circuit of the plurality of storage circuits includes:
a plurality of holding circuits, wherein
each storage circuit corresponds to at least one pixel of a plurality of pixels,
each holding circuit of the plurality of holding circuits is configured to hold reset data and signal data, and
the signal data is based on an amount of light received by a pixel of the plurality of pixels; and an arithmetic circuit commonly connected to the plurality of holding circuits, wherein the arithmetic circuit is configured to:
obtain a difference between the reset data and the signal data; and
output the difference as pixel data;
a data transfer circuit configured to transfer the output pixel data; and
a pixel data processing circuit configured to process the transferred pixel data.

13. A control method of a solid-state imaging element, the control method comprising:
holding, by each holding circuit of a plurality of holding circuits in each storage circuit of a plurality of storage circuits, reset data and signal data, wherein
each storage unit correspond to at least one pixel of a plurality of pixels,
the signal data is based on an amount of light received by a pixel of the plurality of pixels,
each storage circuit of the plurality of storage circuits includes an arithmetic circuit, and
the arithmetic circuit is commonly connected to the plurality of holding circuits;
obtaining, by the arithmetic circuit, a difference between the reset data and the signal data;
outputting, by the arithmetic circuit, the difference as pixel data; and
transferring, by a transfer circuit, the output pixel data.

* * * * *